United States Patent
King et al.

(10) Patent No.: US 12,464,073 B1
(45) Date of Patent: Nov. 4, 2025

(54) MANAGING BRAND IDENTITY, BRAND SECURITY, AND BRAND REPUTATION ACROSS COMMUNICATION NETWORKS

(71) Applicant: FoneTech Connect, LLC, Peachtree Corners, GA (US)

(72) Inventors: David Alan King, Peachtree Corners, GA (US); Linda Lorimer King, Peachtree Corners, GA (US); Nathan Jess Nelson, Peachtree Corners, GA (US)

(73) Assignee: FoneTech Connect, LLC, Peachtree Corners, GA (US)

( * ) Notice: Subject to any disclaimer, the term of this patent is extended or adjusted under 35 U.S.C. 154(b) by 0 days.

(21) Appl. No.: 19/054,244

(22) Filed: Feb. 14, 2025

Related U.S. Application Data

(63) Continuation-in-part of application No. 18/791,501, filed on Aug. 1, 2024, now Pat. No. 12,244,761.

(51) Int. Cl.
*H04M 3/42* (2006.01)
*H04M 3/22* (2006.01)
*H04M 3/424* (2006.01)

(52) U.S. Cl.
CPC ..... *H04M 3/42059* (2013.01); *H04M 3/2281* (2013.01); *H04M 3/42042* (2013.01); *H04M 3/424* (2013.01)

(58) Field of Classification Search
None
See application file for complete search history.

(56) References Cited

U.S. PATENT DOCUMENTS

| | | | |
|---|---|---|---|
| 10,855,840 B2 * | 12/2020 | Kent | G06N 20/00 |
| 2012/0294435 A1 * | 11/2012 | Cox | H04M 15/47 |
| | | | 379/201.02 |
| 2016/0182716 A1 * | 6/2016 | Tatourian | H04M 3/42042 |
| | | | 455/414.1 |
| 2022/0294890 A1 * | 9/2022 | Birch | H04M 3/436 |
| 2023/0362299 A1 * | 11/2023 | Ranalli | H04M 3/42059 |

* cited by examiner

*Primary Examiner* — Hemant S Patel
(74) *Attorney, Agent, or Firm* — H. Brock Kolls

(57) ABSTRACT

The present invention relates to call routing, caller identification management, and telecommunications reputation and brand analysis. It provides methods for increasing call connections to consumers across multiple communications networks by analyzing call reputation and branding data associated with an originating calling party identifier and selecting the identifier with the most favorable reputation and accurate branding. The methods include configuring computing devices with distinct receiving called party identifiers, initiating inquiry call attempts to capture calling party reputation and brand analysis data, and communicating the data to a server. If an inquiry call attempt fails, a second attempt is made to an alternate receiving called party identifier. The server determines a preferred originating calling party identifier based on a computed risk factor derived from reputation and brand analysis data across multiple networks. The preferred identifier is then used for outbound calls reducing mislabeling, improving brand identity, and increasing consumer answer rates.

20 Claims, 23 Drawing Sheets

Fig. 5 — 406/222B

Brand Scans help you measure how your Business Name is being displayed on the mobile phones that you call. Each of your DID numbers is checked for the Business Name that is being displayed on each of your tested network carriers and software applications. Then, a Match Score is assigned describing how close the Displayed Business Name is to the Preferred Business Name entered on the Manage Numbers page. The Match Scores are:

Perfect Match. The Displayed Business Name is an exact match to the Preferred Business Name.

Near Perfect Match. The Displayed Business Name has spacing or capitalization variations.

Brand Variation. The Displayed Business Name includes abbreviations or other variations of your Preferred Business Name.

Incorrect Branding. The Displayed Business Name shows the type of business, a tag or another result that is related to the business but is not your Preferred Business Name.

Unrelated Result. The Displayed Business Name is not directly related to the Preferred Business Name. This may include displaying the city or state.

No Brand Present. No Business Name is displayed. Usually only the calling phone number is being displayed.

MANAGING BRAND IDENTITY, BRAND SECURITY, AND BRAND REPUTATION ACROSS COMMUNICATION NETWORKS

CROSS-REFERENCE TO RELATED APPLICATIONS

This application contains subject matter which is related to the subject matter of the following co-pending application. The below-listed application is hereby incorporated herein by reference in its entirety:

This is a U.S. non-provisional application that is a continuation in part of a U.S. non-provisional application Ser. No. 18/791,501, inventor David Alan King et al., entitled "ORIGINATING CALLING PARTY IDENTIFIER LIFECYCLE MANAGEMENT", filed Aug. 1, 2024.

TECHNICAL FIELD OF THE INVENTION

The present invention relates to call routing, caller identification management, and telecommunications reputation analysis. It provides a method for increasing call connections to consumers by analyzing call reputation and branding data associated with an originating calling party identifier across multiple communications networks. By assessing how calling party identifiers are classified and selecting the most favorable identifier, the system reduces mislabeling, enhances brand identity, and improves call answer rates.

This technology is particularly beneficial for enterprise call centers and telecommunications providers seeking to optimize outbound call effectiveness. By performing inquiry call attempts and evaluating network-applied classifications and branding accuracy, the system ensures that calls are placed using identifiers that maintain a positive reputation. The method further includes software control message based call termination, automated retesting of blocked numbers, and branding reputation reporting, enabling data-driven selection of optimal calling party identifiers while addressing challenges in fraud prevention, branded caller identity management, and regulatory compliance.

BACKGROUND OF THE INVENTION

Before our invention, consumers routinely received caller identification information on their wireless phones. Such information was intended to inform consumers who was calling them before answering the phone. Frequently customers and consumers decide whether or not to answer the call based on the caller identification information. As such, a shortcoming is that when the call identification information is not correct or is misinformative, the consumer is less likely to answer the call.

To exacerbate this shortcoming, communications networks like AT&T, T-MOBILE, VERIZON, and others, for the same originating calling number or caller identification information, can report different caller identification information. This makes it hard for a company or organization to detect, remedy, and keep track of such errors.

From a business perspective, when the caller identification information is not correct, a company's or organization's brand can suffer.

Another shortcoming is that the communications networks from time to time substitute labels such as SPAM or other labels for certain originating calling numbers or caller identification information. This can further hinder businesses and organizations from reaching customers or consumers. In this regard, companies and organizations may be unaware this is happening, and as such their brand identity, brand security, and brand reputation can suffer when using certain originating calling numbers or caller identifiers. In some cases, an originating calling number or caller identifier may even be blocked, and as such a company's or organization's calls don't even reach their customers or consumers.

Another shortcoming is that originating calling numbers or caller identification information may be spoofed or falsified by bad actors seeking to trick consumers into answering their calls. By displaying false calling numbers or caller identification information, bad actors may make it appear that their call is coming from a legitimate business, government agency, or even an entity with whom the called party may have had a prior relationship. The brand reputation of a business or government agency whose brand security has been compromised by having their brand identity spoofed or falsified in such a manner may suffer serious and ongoing harm.

The present invention addresses these and other shortcomings by providing methods of managing brand identity, brand security, and brand reputation delivered by a communications network by monitoring calling party reputation data associated with originating calling party identifiers such as phone numbers and other identifiers used on the communications network and other advantages. For these reasons and shortcomings as well as other reasons and shortcomings there is a long-felt need that gives rise to the present invention.

SUMMARY OF THE INVENTION

The shortcomings of the prior art are overcome, and additional advantages are provided through a method of increasing call connections to consumers across multiple communications networks by analyzing call reputation and branding data associated with an originating calling party identifier and selecting the identifier with the most favorable reputation and most accurate branding for initiating consumer calls.

The method improves outbound call success rates by dynamically evaluating how calling party identifiers are classified and labeled across different communications networks. It begins by configuring or identifying computing devices that serve as test endpoints, each associated with a distinct receiving called party identifier. A number sentry server initiates an inquiry call attempt by transmitting a request to a call generation server, which places the call to a designated receiving called party identifier. If the call is successfully received by a computing device, the calling party reputation data is captured and transmitted to the number sentry server. If the first inquiry call attempt fails, the number sentry server initiates a second inquiry call attempt directed to a different computing device with a separate receiving called party identifier. The captured reputation data from this second attempt is also communicated to the number sentry server.

With multiple data points collected, the method further comprises determining a preferred originating calling party identifier at the number sentry server. This determination is based on an originating calling party identifier risk factor, computed by analyzing the captured reputation data from multiple networks to identify mislabeling, incorrect branding, or call-blocking risks. By dynamically selecting the preferred originating calling party identifier, the method ensures that outbound calls are made using the identifier with the highest likelihood of being answered by consumers.

This approach reduces call mislabeling, improves brand identity, enhances call reputation, and increases consumer engagement with incoming calls. By leveraging continuous monitoring and adaptive optimization, the method overcomes the limitations of traditional static number management systems and provides a data-driven approach to call connection efficiency in enterprise communications, call center operations, and brand reputation management.

Additional shortcomings of the prior art are overcome, and additional advantages are provided through a method that increases call connections to consumers across multiple communications networks by continuously analyzing call reputation and branding data associated with an originating calling party identifier. The method ensures that each identifier is assessed based on its classification, reputation, and branding accuracy, allowing for the selection of the most favorable identifier for initiating consumer calls.

The process involves configuring computing devices, each associated with a distinct receiving called party identifier, to operate across multiple communications networks. For each originating calling party identifier and network, the method initiates an inquiry call attempt by instructing a number sentry server to transmit a request to a call generation server, which then places the call. When a computing device successfully receives the inquiry call, it captures the associated calling party reputation data and communicates it to the number sentry server. If the first inquiry call attempt fails, the number sentry server initiates a second inquiry call attempt using a different receiving called party identifier, ensuring that additional data points are collected to verify how the originating calling party identifier is presented across different networks.

The method further includes iterating this process across multiple originating calling party identifiers and multiple communications networks, allowing for a comprehensive analysis of call classification trends. The number sentry server then determines the preferred originating calling party identifier based on a calculated risk factor, which accounts for variations in branding accuracy, mislabeling patterns, and network-specific call handling characteristics. By systematically evaluating and selecting the identifier with the most favorable reputation, the method optimizes call placement strategies to improve consumer response rates.

This approach enables businesses and call centers to dynamically adjust their outbound calling strategies based on continuous monitoring of network data. By ensuring that the selected originating calling party identifier is the one least likely to be mislabeled or blocked, the method enhances call deliverability, strengthens brand identity, and increases consumer trust. The ability to monitor multiple networks and refine calling strategies based on empirical data provides a significant advantage over static number reputation management techniques, leading to improved call connection rates and higher engagement with consumers.

Additional shortcomings of the prior art are overcome, and additional advantages are provided through a method that enhances call connection rates to consumers across multiple communications networks by analyzing how an originating calling party identifier is classified, its reputation, and its branding accuracy. By selecting the identifier with the most favorable characteristics, the method ensures that outbound calls are placed using an identifier that minimizes mislabeling and improves consumer response rates.

The process begins by configuring or identifying computing devices, each associated with a different receiving called party identifier, and operating them within a communications network to monitor how calls are received and classified. A number sentry server initiates a first inquiry call attempt by instructing a call generation server to place the call using a specified originating calling party identifier. If the first computing device successfully receives the call, it captures and transmits the calling party reputation data back to the number sentry server. If the first attempt fails, the system proceeds with a second inquiry call attempt, placing the call to a different computing device with an alternate receiving called party identifier. The captured reputation data from both attempts provides a comprehensive assessment of how the originating calling party identifier is being classified across different network conditions.

Once the necessary data has been collected, the method incorporates an automated termination process, removing the need for an answer server. Instead, the number sentry server transmits software control message command to the call generation server, instructing it to terminate the active inquiry call attempt. Upon receiving the software control message command, the call generation server executes the termination, ensuring that calls are efficiently ended after the required data is captured. This streamlined termination approach eliminates unnecessary delays and system complexities, optimizing performance while preserving the integrity of the captured call reputation data.

Following data collection and termination, the number sentry server determines the preferred originating calling party identifier by evaluating a risk factor based on the captured reputation data. This risk assessment accounts for branding accuracy, mislabeling tendencies, and other factors influencing call reception. The originating calling party identifier with the lowest risk and most favorable classification is selected to initiate future consumer calls. By using this dynamically determined identifier, the method significantly reduces the likelihood of calls being mislabeled or blocked, enhances brand trust, and increases the probability that consumers will answer the calls.

This approach replaces static and reactive number management techniques with a proactive and adaptive system that continuously refines calling strategies based on recent network data. By leveraging automated inquiry calls, reputation analysis, and software control message-driven call termination, the method provides a highly efficient way to ensure that businesses, call centers, and enterprises maximize their consumer call engagement while maintaining a strong and reliable brand identity.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 9-11 illustrates examples of user interface screenshots and information screenshots;

FIG. 12 illustrates one example of a report to assign risk factors and brand match scores to call reputation data;

FIGS. 13-15 illustrates examples of user interface screenshots and information screenshots;

The detailed description explains the preferred embodiments of the invention, together with advantages and features, by way of example with reference to the drawings.

DETAILED DESCRIPTION OF THE INVENTION

The present invention relates to call routing, caller identification management, and telecommunications reputation analysis. More specifically, it pertains to systems and methods for increasing call connections to consumers by analyzing call reputation and branding data associated with an originating calling party identifier across multiple communications networks. By evaluating and selecting the most favorable calling party identifier, the system improves outbound call effectiveness, reduces mislabeling, and enhances brand identity in telecommunications networks.

This technology is particularly applicable to enterprise call centers, telecommunications service providers, and organizations managing large-scale outbound calling operations. Traditional approaches to number reputation management often rely on reactive methods that fail to prevent mislabeling before calls are placed. Inefficient call routing, high call rejection rates, and inconsistent branding result in reduced consumer engagement. By conducting inquiry call attempts to assess how originating calling party identifiers are classified and handled across different networks, the system provides a proactive solution that ensures outbound calls are placed using identifiers that maintain favorable reputation and accurate branding.

Through the collection and evaluation of network-applied classifications, branding accuracy, and reputation data, the system enables data-driven selection of an optimal calling party identifier. This approach strengthens consumer trust in received calls by improving branding consistency and reducing instances where legitimate business calls are mislabeled as spam or fraud. The system further incorporates software control message-based call termination, automated retesting of blocked numbers, and branding reputation reporting to continuously refine outbound call strategies.

This technology addresses key challenges in telecommunications fraud prevention, branded caller identity management, and regulatory compliance, ensuring that outbound call strategies are adaptable to evolving industry standards while maximizing call connection rates.

Figure 1:
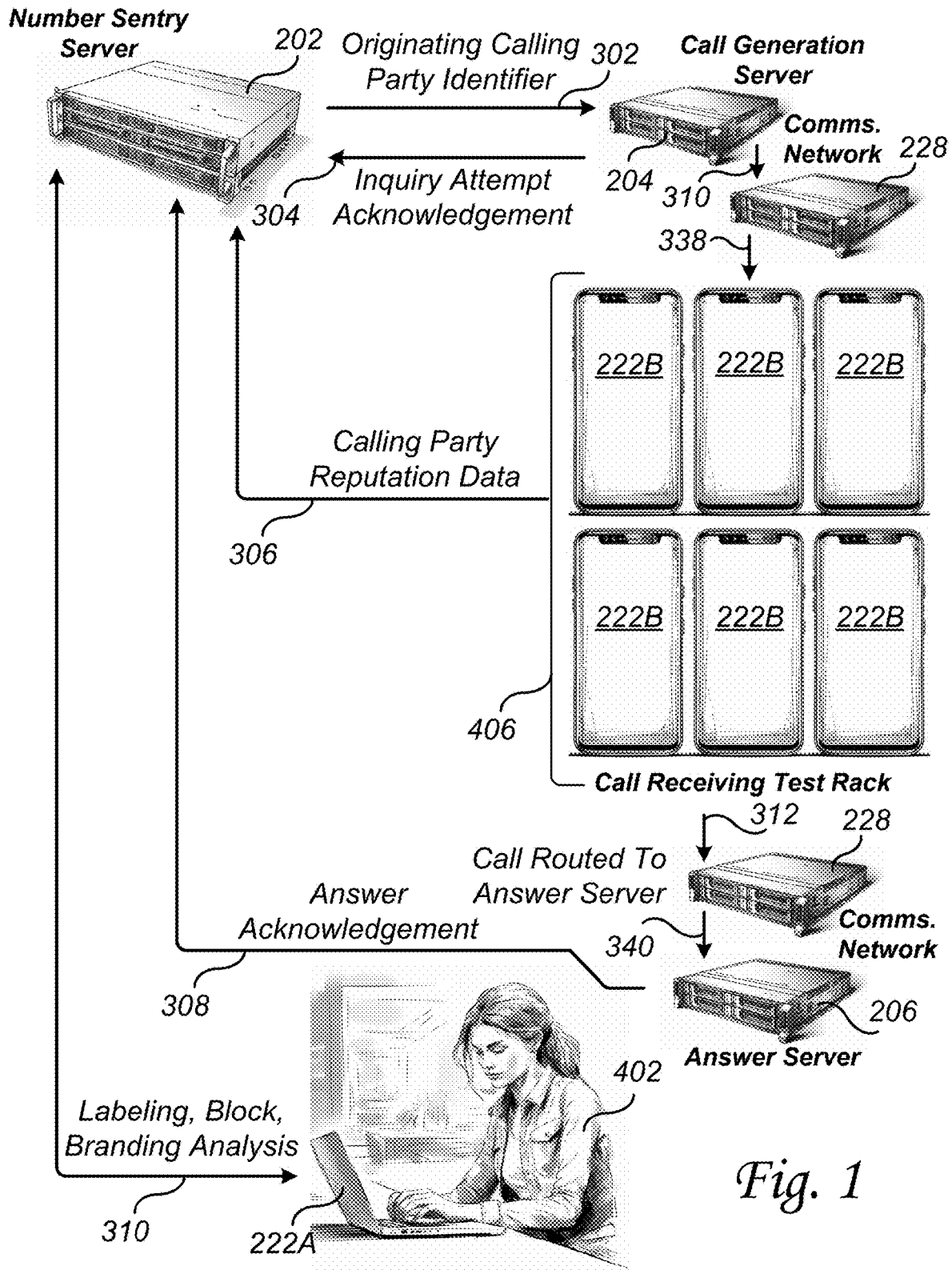
FIGS. 1-3 illustrate examples of managing a brand identity, brand security, and brand reputation system, method, and network.
Figure 2:
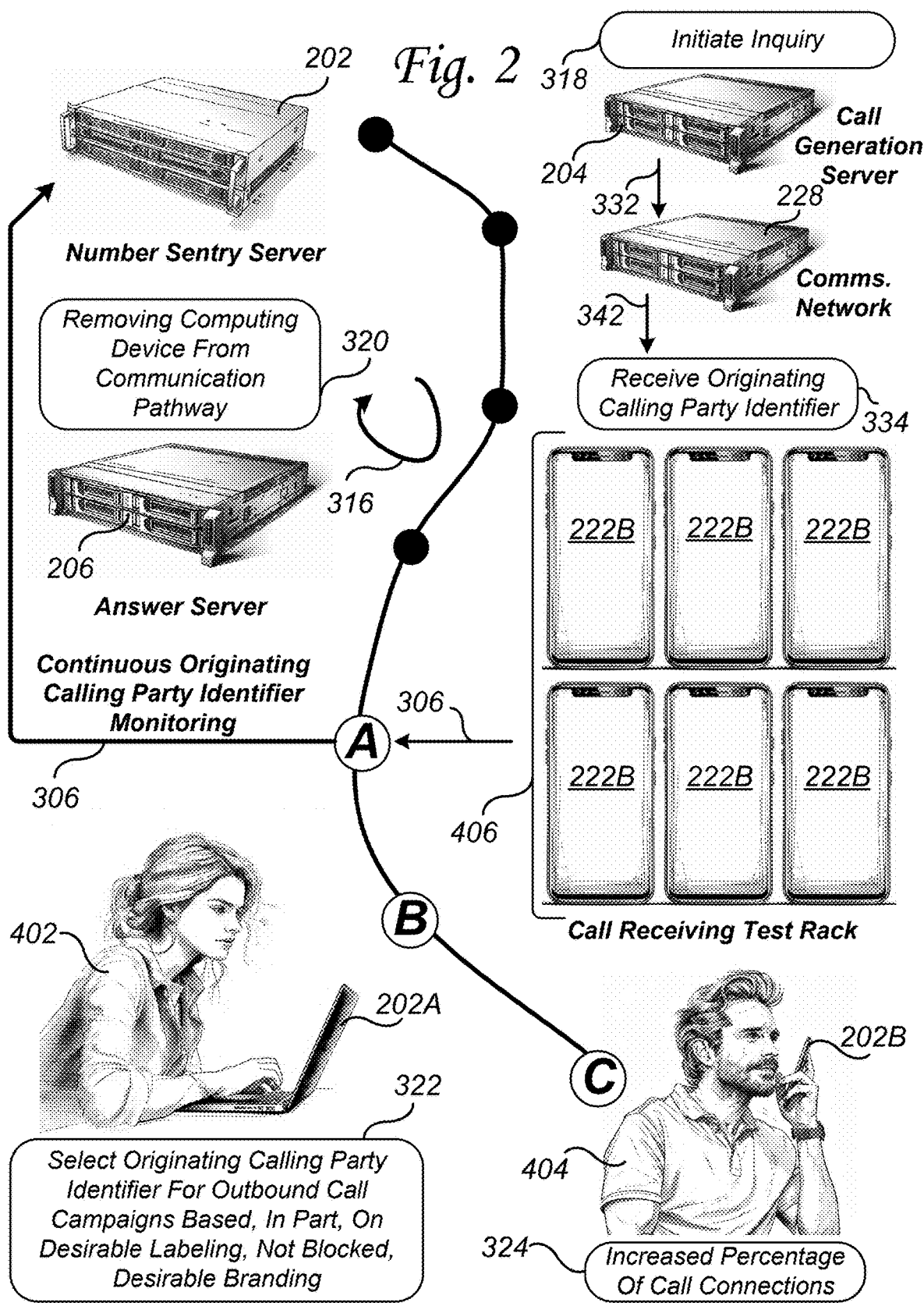

Turning now to the drawings in greater detail, it will be seen that in at least FIGS. 1 and 2, there is illustrated an example of managing a brand identity, brand security, and brand reputation system, method, and network. In an exemplary embodiment, when a consumer 404 receives a call on their computing device 202B which can be a smartphone or other suitable computing device information about the originating calling party can be displayed as a way to inform the consumer 404 who is calling them prior to answering the call. The information displayed can be referred to as the brand identity or the calling party reputation data in that what is displayed to consumer 404 can directly impact the brand reputation of a business or other organization and correspondingly whether or not consumer 404 answers the call.

In the present invention, the brand identity or the "calling party reputation data" can be defined as data that comprises a type or kind of identity, a business or governmental-related activity, an organization, a person, the intention of the call or the reason for the call, a brand or caller logo, an emblem, photograph, likeness or icon related to the person, business or organization or their products or services, or other descriptors. As an example and not a limitation, calling party reputation data can comprise a business name such as ACME, or a business activity such as LAWN SERVICE or other suitable labeling.

Such calling party reputation data can impact brand identity, security, and reputation. To this end, unfortunately, the calling party reputation data for an originating calling party identifier may not always be accurate. The brand identity may have issues such as the wrong brand identity being displayed, misspelled brand identities, missing brand identity, and other errors. Additionally, the calling party reputation data can be substituted for warning labeling by a communications network. As an example, the calling party reputation data may be displayed to the consumer 404 as SPAM LIKELY, FRAUD RISK, or other similar types of risk labeling. Even more disturbing, calling party reputation data may be spoofed, forged, or otherwise altered by bad actors, thus breaching brand security measures. To further complicate matters such calling party reputation data can vary from communications network to communications network. So while the brand identity and caller reputation data might be correct and acceptable for one communications network, it might be incorrectly presented to the consumer on another communications network.

An advantage, in the present invention, is that the calling party reputation data of each of a client's 402 originating calling party identifiers can be monitored for each of the desired communication networks. In this regard, inquiry calls are automatically placed to computing device 222B where each of the computing devices 222B are configured for operation on one of the communications networks. Each inquiry call attempt generates calling party reputation data that can be analyzed for brand accuracy labeling and other risk factors and/or risk warnings that indicate brand security issues or that could impact the caller's brand reputation. Where necessary, corrective actions can be taken to protect brand identity information and in cases of risk labels (i.e. SPAM, etc.) alternative originating calling party identifiers can be requested. For disclosure purposes, communications network equipment that aids in making and receiving calls can be referred to as a communications network 228 or network elements of a communications network 228.

In the present invention, the result of proactive originating calling party identifier monitoring by way of calling party reputation data is that the received call labeling on consumers 404 computing devices 222B can be detected and communicated to the originating caller. In cases where the brand reputation is negatively presented, steps can be taken to better reflect the preferred brand identity, better protect brand security, and enhance brand reputation. Such measures may result in the client 402 increasing the percentage of successful call connections with consumers 404.

In the present invention, the term "originating calling party identifier" refers to a phone number or other suitable identifier used by an originating calling party.

In the present invention, the term "communications network" refers to telecommunication companies and networks such as AT&T, T-MOBILE, VERIZON, and other similar types of communications network telecommunication companies, networks and network equipment.

In the present invention, the term "software control messages" refers to software control messages such as Application Programming Interface (API) commands, webhooks, signaling messages, Integrated Development Environment (IDE) control messages, orchestration control messages and other similar types of control messages that play a role in enabling systems to interact, automate workflows, and ensure seamless communication across different software components.

In an exemplary embodiment and with reference to FIG. 1, a number sentry server 202 maintains a list of clients 402 and their associated originating calling party identifiers which can be phone numbers or other suitable identifiers. For disclosure purposes, client 402 can be referred to as user 402. At a periodic calling party identifier monitoring interval, each of the originating calling party identifiers is monitored and assessed for preferred brand identity, brand security, and brand reputation. In this regard, the originating calling party identifiers place an inquiry communication which is received by one of the computing devices 222B. The computing device 222B receives and sends the calling party reputation data to the number sentry server 202 where analysis, scoring, and reporting can take place.

In operation, the originating calling party identifier and desired receiving called party identifier can be data communicated 302 to a call generation server 204. The call generation server 204 is configured to provide a return data communication 304, including an inquiry attempt acknowledgment and other data that informs the number sentry server 202 that the call generation server 204 received the request and has or will attempt to place a call from the originating calling party identifier to the computing device 222B that is configured with the receiving called party identifier. The call generation server 204 data communicates 310 with a communications network 228 to initiate 338 a call to the computing device 222B. Additionally, in certain embodiments, the call generation server 204 may initiate certain AI-based inquires to augment or enrich the data provided in a return data communication 304.

In the present invention, the term "receiving called party identifier" is intended to mean the computing device 222B identifier such as a phone number or other suitable identifier.

Figure 4:
FIGS. 4-5 illustrate examples of a plurality of computing devices in a call-receiving test rack configured for operation on one or more communication networks.
Figure 5:
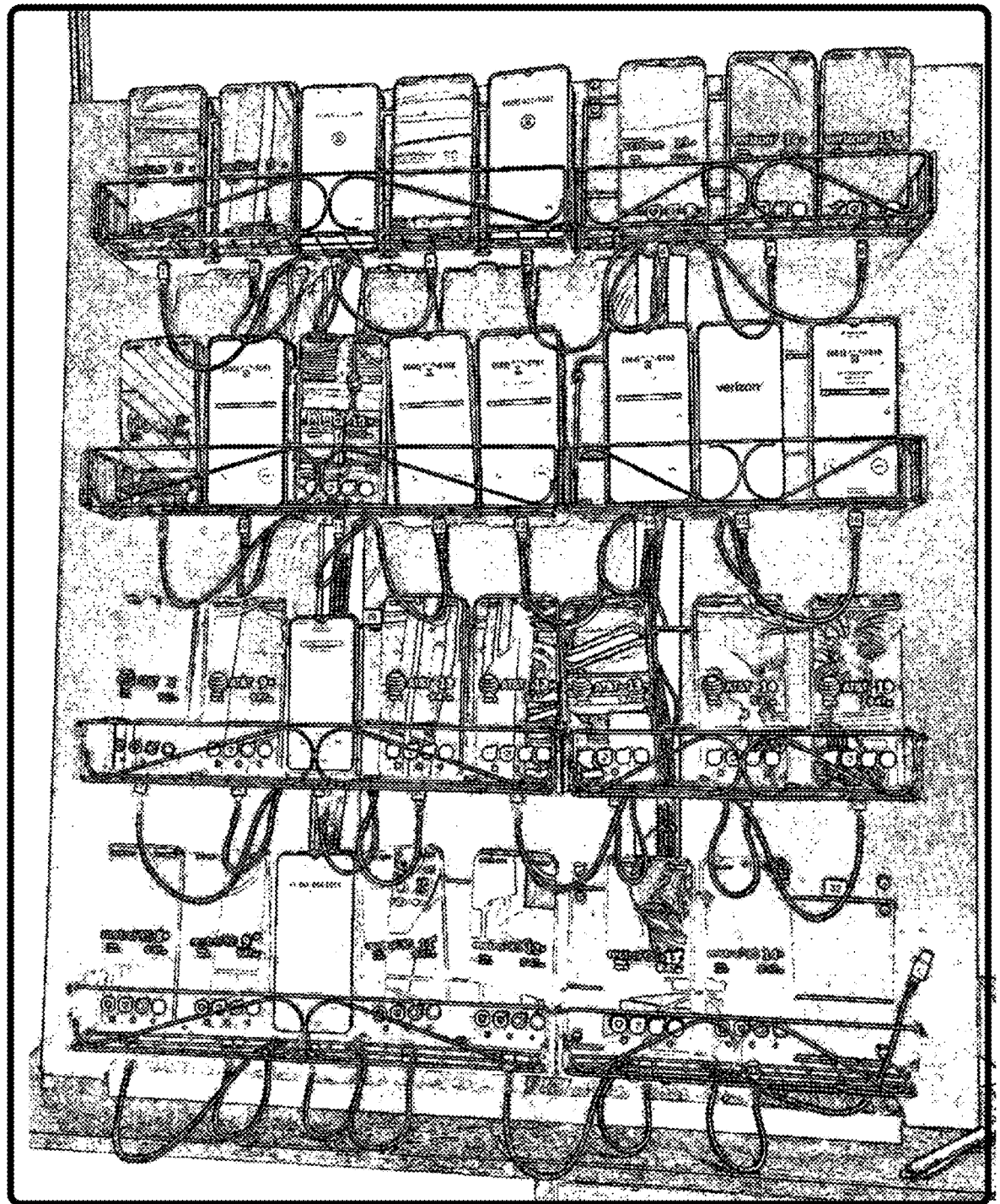

As better illustrated in at least FIGS. 4 and 5, a plurality of computing devices 222B can be organized into a call receiving test rack 406. Each of the plurality of computing devices 222B can be configured with a different receiving called party identifier such as a receiving phone number or other suitable receiving identifier. Additionally, one or more of the plurality of computing devices 222B in the call receiving test rack can be configured to operate on different communication networks so that the same originating calling party identifier can be tested on different communication networks by calling different receiving called party identifier as desired and/or requirement in a particular embodiment.

With reference again to FIG. 1, when one of the computing devices 222B receives an incoming call from one of the originating calling party identifiers the incoming call is processed and a plurality of calling party reputation data is captured. Prior to capturing data, the computing device can implement a start capture delay to allow the computing device 222B to complete other processing steps and prepare for calling party reputation data capture.

Such calling party reputation data may comprise a presentation of the originating calling party identifier call user interface data, and other data as may be required and/or desired in a particular embodiment.

Additionally, in an exemplary embodiment, such calling reputation data can comprise one or more screenshots of the plurality of calling party reputation data present on the display associated with the computing device 222B.

The call is then routed 312/340 to an answer server 206, by way of communications network 228, which removes the computing device 222B from the communication pathway between the call generation server 204 and the answer server 206. The computing device 222B then data communicates 306 the calling party reputation data to the number sentry server 202. Additionally, some calling party reputation data may be communicated to other servers and computing resources for subsequent processing and accessibility. Furthermore, computing devices 222B may initiate certain AI-based inquiries to augment or enrich captured calling party reputation data or other call-related data.

The routed call 312 will traverse various network elements of one or more communications networks 228 between the call generation server and the answering server. In certain embodiments, one or more of these network elements may also communicate relevant call data and calling party reputation data to the number sentry server 202 for purposes that may include but are not limited to, the detection of brand identity, ensuring brand security protocols have not been compromised and the assessment of brand reputation. Furthermore, in some embodiments, certain network elements may initiate AI-based inquiries to augment or enrich captured calling party reputation data or other call-related data provided in a data communication.

Upon receiving the routed call, the answer server can data communicate 308 an answer acknowledgment and other data, including call-related data, to the number sentry server 202 acknowledging it has answered and established communication with the call generation server to manage the remainder of the call. Furthermore, in some embodiments, the answer server 206 may initiate AI-based inquiries to augment or enrich captured calling party reputation data or other call-related data provided in a data communication 308. In some operational embodiments, the answer server 206 also generates a tonal pattern or other suitable noise for a predetermined call relief time. Such predetermined call relief time can be in the range of several seconds or longer, and preferably in the range of greater than 30 seconds. One intended purpose of the relief time is to continue the length of a call to satisfy minimum communication network service agreements which typically require calls of a minimum duration to avoid additional service costs. Another intended purpose of the relief time is to prevent a short-duration call which may negatively impact the brand reputation of a calling number or other call identifier by the communication network 228. Once the relief time has elapsed, the inquiry call attempt is terminated.

The process continuously repeats with the number sentry server 202 initiating inquiry attempts using different originating calling party identifiers to receive called party identifiers on different communications networks 228. The number sentry server 202 gathering inquiry attempt acknowledgments and data 304, calling party reputation data 306, answer server acknowledgments and data 308, and other data to make an informed evaluation of brand identity, brand security, and brand reputation including scoring risk factors associated with using the originating calling party identifiers on a specific communications network 228 to attempt to communicate or otherwise call a consumer's 404 computing device such as their smartphone or other similar device.

To manage brand identity, brand security, and brand reputation a client/authorized user 402 may choose to make determinations of which of the originating calling party identifiers to use on which of the communications network 228. A client/authorized user 402 can use a computing device 222A such as a laptop computer, or other suitable computing device 222A to data communicate 310 with the number sentry server 202 to retrieve, review, configure, or otherwise manage results including labeling, blocked, and/or branding analysis associated with the brand security and brand reputation of their originating calling party identifiers.

Referring to FIG. 2, there is illustrated an example of a brand identity, brand security, and brand reputation management system, method, and network. In an exemplary embodiment, the number sentry server 202 can initiate an inquiry call attempt 318. In operation, a call generation server 204 receives, acknowledges, and provides data to the number sentry server 202, and executes, by way of a communications network 228, the inquiry call attempt 332/334. The inquiry call request comprises an originating calling party identifier such as an originating phone number or other suitable identifiers, and a receiving called party identifier such as a receiving phone number or other suitable identifier that is associated with one of the computing platforms 222B.

The computing platform 222B, associated with the receiving called party identifier, receives 334 the inquiry request, such as a call, from the call generation server 204 using the originating calling party identifier.

In reference 'A', if the inquiry call attempt is received at the computing device 222B a plurality of calling party reputation data is captured about the originating calling party identifier. The plurality of calling party reputation data is then data communicated 306 to the number sentry server 202. The plurality of computing devices 222B may also initiate certain AI-based inquiries to augment or enrich captured calling party reputation data or other call-related data that may also be data communicated 306 to the number sentry server 202. In the case that the inquiry call attempt is not received at the computing device 222B it may be because the originating calling party identifier might have been blocked by the communications network, by an app that has been preloaded onto the computing device 222B, or by the computing device 222B itself.

In this case, the number sentry server 202 can deduce a blocked originating calling party identifier when number sentry server 202 receives the acknowledgment from the call generation server 204 but does not receive any captured plurality of calling party reputation data from the computing device 222B associated with the receiving called party identifier. Then, a second inquiry call attempt can be initiated by the number sentry server 202. In an exemplary embodiment, a second or additional inquiry call attempt to verify a communications network blocked originating calling party identifier can be initiated to a different receiving called party identifier associated with a different computing device 222B on the same communications network to verify that a communications network blocked the call placed from the originating calling party identifier.

In operation, computing platforms 222B are removed from the call communication path by transferring the call to an answer server 206. The computing device 222B is then prepared to receive the next inquiry call attempt, while the answer server completes the current, in-progress call with the call generation server 204, which may also provide audio or tones for a relief time to satisfy communications network service agreements prior to terminating the call.

In an exemplary embodiment, continuous 316 originating calling party identifiers are monitored by repeating the method for each of the originating calling party identifiers on each of the communications networks at a predetermined interval and the number sentry server 202 receives the inquiry attempt acknowledgments and data 304, calling party reputation data 306, answer acknowledgments and data 308, and other data to make an informed evaluation of brand identity, brand security, and brand reputation including scoring risk factors associated with using the originating calling party identifiers on a specific communications network. Such an evaluation enables better brand identity, brand security, and brand reputation management by the client or user 402 when attempting to communicate or otherwise call a consumer's 404 computing device such as their smartphone or other similar device.

In this regard, in reference 'B', a client or user 402 can review the analysis of originating calling party identifiers across some or all communications networks including viewing the brand identity, any warning labeling applied by a communications network and communications network blocked and not blocked originating calling party identifiers. User 402 can then select or enable the selection of 322 the originating calling party identifiers for outbound call campaigns based, in part, on desirable brand identity, not blocked, desirable calling party reputation data, and other factors.

In reference 'C', an advantage, in the present invention, is that the method of testing, capturing, and analyzing calling party reputation data for originating calling party identifiers on multiple communication networks in a continuous manner, allows user 402 to select or enable the selection of 322 the best originating calling party identifiers from a branding, labeling, not blocked, and optimal risk of use perspective for use in calling consumers 402. This strategy is shown to increase 324 the percentage of call connections that consumer 404 is willing to answer or otherwise respond to by providing consumer 404 more complete or more accurate calling party reputation data to inform their decision of whether to answer user's 402 call, thus enabling the company/organization/user 402 to more effectively reach their consumer 404.

Figure 3:
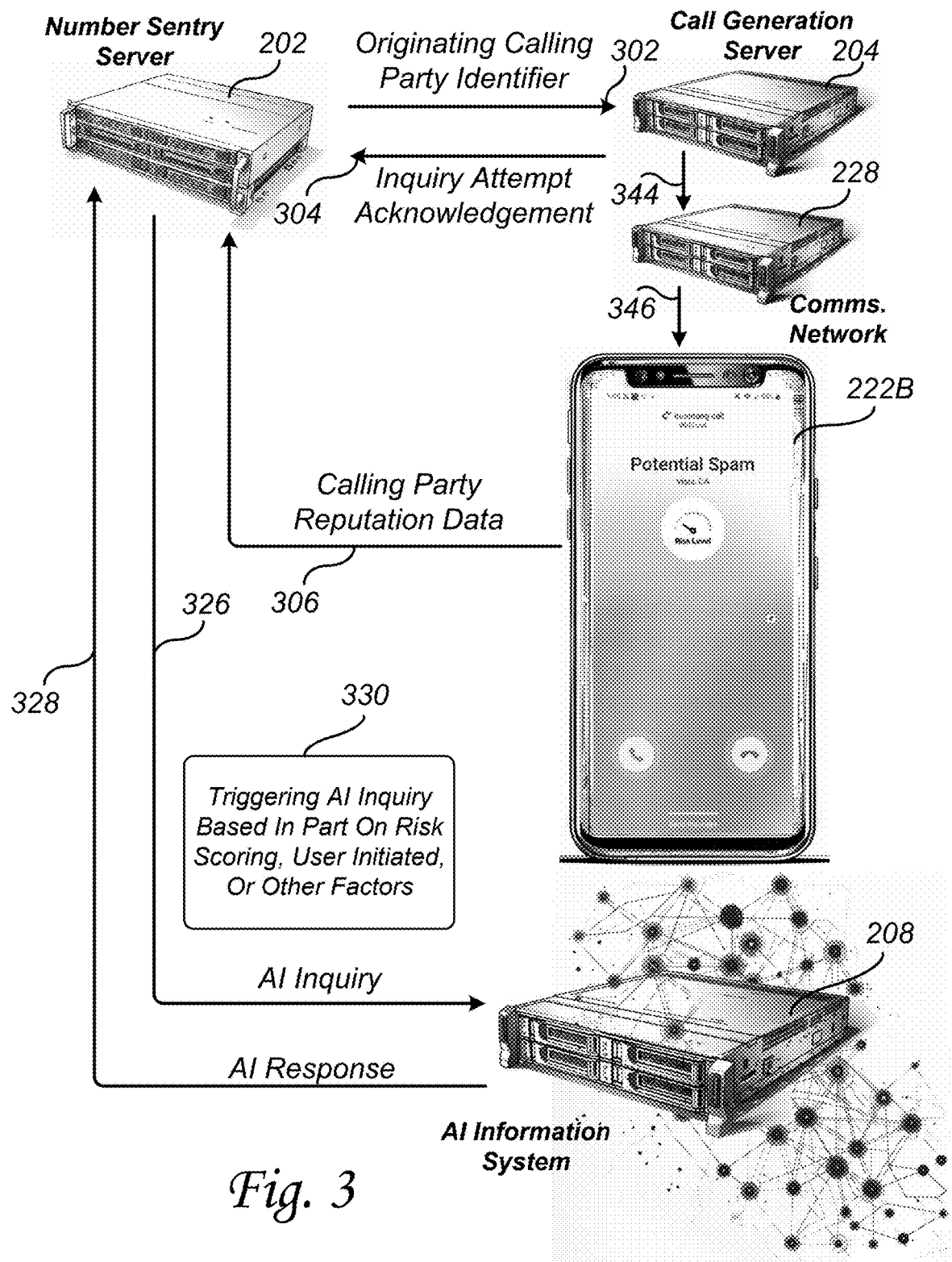

Referring to FIG. 3, there is illustrated an example of managing a brand identity, brand security, and brand reputation system, method, and network. In an exemplary embodiment, similar to the methods in FIGS. 1 and 2, the number sentry server 202 initiates originating calling party identifier monitoring on a plurality of communications networks with the aid of data communications 344/346 with and between the call generation server 204, communications network 228, and computing devices 222B.

Additionally, triggering 330 artificial intelligence (AI) based inquiries which may include, but are not limited to machine learning, deep learning, natural language processing, and other forms of AI inquiries as may be required and/or desired in a particular embodiment can be effectuated based on the calling party reputation data, originating calling party identifier risk scoring, brand identity data, brand security indicators, relevant call data provided by network elements of a communication network or by the call generation server 204, the answering server 206 or other relevant data sources, user 402 initiation, or other factors and sources, as may be required and/or desired in a particular embodiment. In the exemplary example of FIG. 3, the number sentry server 202 can initiate an AI inquiry data communication 326 to and with an AI information system 208. In response, the AI information system 208 can generate and data communicate 328 an AI response to the number sentry server 202. The number sentry server 202 can then parse and analyze the AI response to provide additional insight, context, and other learnings related to the originating calling party identifier being monitored and for other reasons, as may be required and/or desired in a particular embodiment.

In a plurality of exemplary embodiments, the use of AI inquiries 326 and responses 328 can be related to better understanding the plurality of calling party reputation data including labeling and call naming, as well as the companies, organizations, individual persons, and other entities associated with the originating calling party identifiers including but not limited to legal matters, insurance matters, social media presence, social media reputation, ownership, brand security matters, reasons communications network may be blocking or otherwise restricting, and a variety of other matters.

In operation, the AI information system 208 can be one or more AI systems and each of the AI systems can be configured to provide different kinds or types of AI response data. As an example, some generative AI systems can be configured for social media and general information types of requests related to natural language processing, some machine learning and/or deep learning AI systems can be configured for telecommunication-related information, legal or regulatory information, and other AI systems can be configured to interact and provide other types and/or kinds of information as may be required and/or desired in a particular embodiment.

In an exemplary embodiment, one or more of the AI systems can be accessed by the number sentry server 202, the call generation server 204, computing devices 222B, network elements of a communications network 228, answer server 206, or computing device 202B as permitted, desired or needed.

Referring to FIG. 4, there are illustrated examples of a plurality of computing devices 222B in a call receiving test rack 406 that are configured for operation on one or more communication networks. With reference to FIG. 4 reference 'A', one example of calling party reputation data can include receiving call labels as "POTENTIAL SPAM". In reference 'B' a call is being received on one of the computing devices 222B with call labeling of "NUMBER SENTRY". In general call labeling bearing a preferred brand label as determined by the client/user 402 is regarded as low risk and increases the probability of a consumer 404 making a call connection. In reference 'C', one example of calling party reputation data can include receiving call labels as "TELEMARKETER". In reference 'D', one example of calling party reputation data can include receiving call labels as "ROBO CALLER". In reference 'E', one example of calling party reputation data can include receiving call labels as "NUISANCE LIKELY". In reference 'F', one example of calling party reputation data can include receiving call labels as "SCAM LIKELY". These are just some examples and the calling party reputation data can indicate other types and/or kinds of labeling.

While user 402 helps establish the preferred brand labeling for an originating calling party identifier, often the brand labeling is not correct when a consumer 404 receives a call on their computing device 202B. Some issues may include minor things like capitalized letters, run-on words, or spaces positioned incorrectly between words such that the brand identity presented when a consumer 404 receives a call on their computing device 202B does not perfectly match the user's 402 preferred brand identity. Sometimes the brand identity presented when a consumer 404 receives a call on their computing device 202B may be missing altogether or doesn't match the preferred brand identity at all and may even be misdirective. The present invention detects actual call brand identity on a plurality of communications networks and apps in view of the user's 402 preferred brand identity and enables brand management such as taking corrective action to remedy the incorrect brand identity data.

In other cases, a communication network may decide through analysis, customer complaints, or other data sources that an originating calling party identifier should be modified and displayed as a scam, spam, robocall, telemarketer, nuisance, or other similar types of risk labeling. In these cases, the actual brand identity is often suppressed or altered, and a warning type of risk labeling is displayed on the consumer's 404 computing device 202B as a way to inform the consumer 402 of the possible intent of the party who is calling them. The present invention detects actual risk labeling which may be incorrect or otherwise misdirective and enables brand management such as taking corrective action to remedy the incorrect risk label.

In other cases, the brand identity of originating calling numbers or caller identification information may be spoofed or falsified by bad actors to display false calling numbers or caller identification information. The present invention may detect such brand security issues and can enable brand management by user 402 or other designated parties such as taking corrective action to remedy or mitigate brand security incidents.

FIG. 5 illustrates an in-operation call-receiving test rack 406 with a plurality of computing devices 222B receiving calls from many originating calling party identifiers on more than one communications network.

Figure 6:
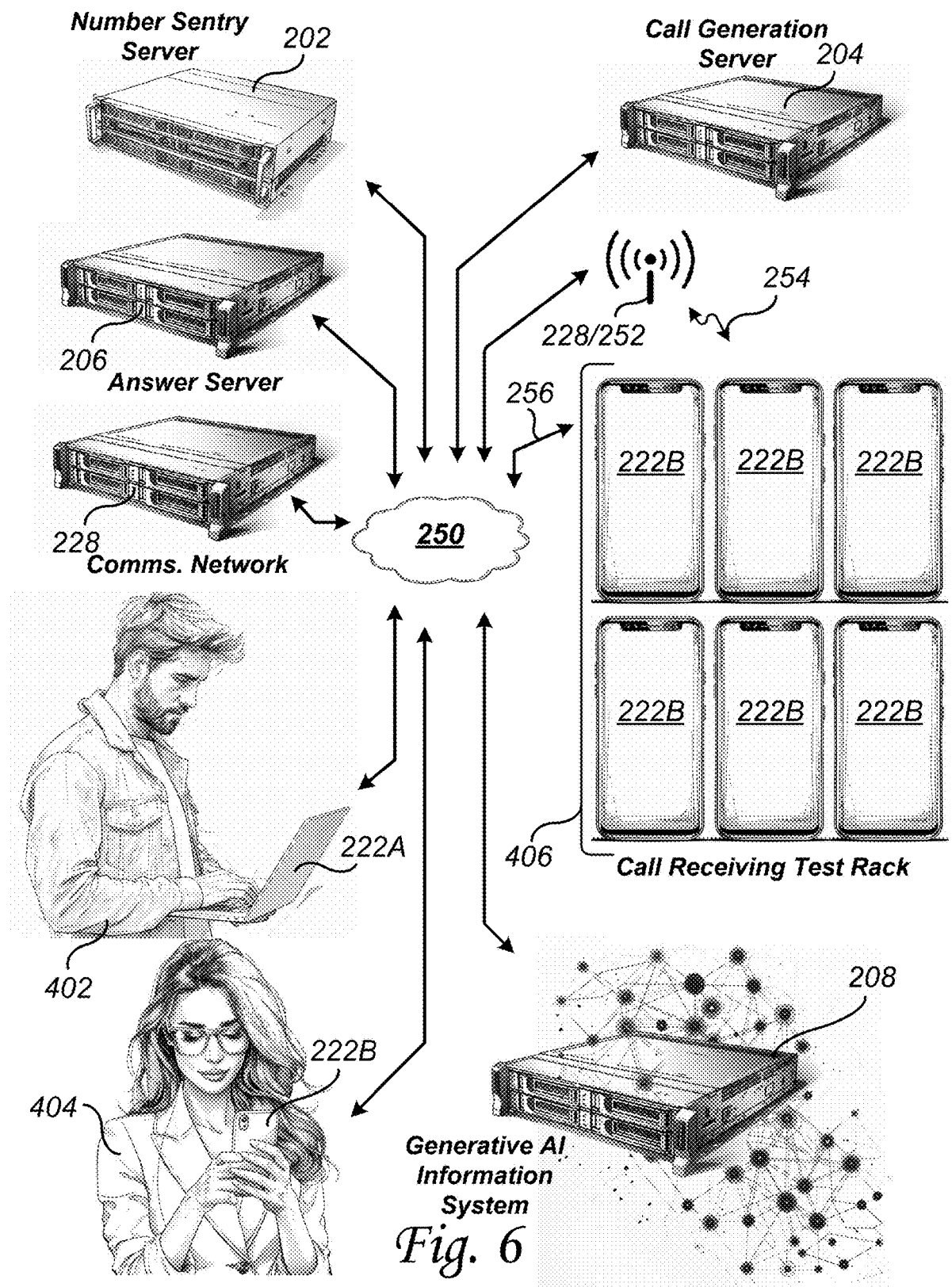
FIG. 6 illustrates one example of managing a brand identity, brand security, and brand reputation network.

Referring to FIG. 6, there is illustrated one example of managing a brand identity, brand security, and brand reputation system, method, and network. In an exemplary embodiment, remote data processing resources can include the number sentry server 202, the call generation server 204, the answer server 206, the plurality of computing device 222B, network elements of a communications network 228, and the AI information system 208. Each of the number sentry server 202, the call generation server 204, the answer server 206, the plurality of computing devices 222B, network elements of a communications network 228, the AI information system 208, and other remote data processing resources can data communicate with each other across a global network 250. The Internet and other added network elements of a communication network can be a global network 250.

Consumers 404, and clients/users/other authorized persons 402 (referred to as user 402) can use computing devices 222A/222C to data communicate with the remote data processing resources 202/204/206/208/228 as appropriate and as may be required and/or desired in a particular embodiment. In an exemplary embodiment, such computing devices 222A are typically laptops and desktop-style computers, and computing devices 222B/222C are typically mobile computing devices such as tablets, smartphones, and other similar types and/or kinds of mobile computing devices. In operation, computing devices 222B/222C can be smartphones and similar devices, and be configured to operate on a communications network. Such computing devices 222B/222C can data communicate 254 with other data processing devices by way of communications networks 228 hardware resources/wireless communications 252 such as AT&T, T-MOBILE, VERIZON, GSM type, CDMA type, third-generation (3G), fourth-generation (4G), or fifth-generation (5G), or other suitable types and/or kinds of communications networks. Additionally, such computing devices 222B/222C can data communicate 256 with other data processing devices by way of WiFi, or by other suitable methods, as may be required and/or desired in a particular embodiment.

In an exemplary embodiment, data processing resources 202/204/206/208/228 can be one or more servers, network storage devices, or other types and kinds of data processing resources. Such data processing resources can be AMAZON WEB SERVICES (AWS), MICROSOFT AZURE, GOOGLE CLOUD PLATFORM (GCP), or other types and kinds of hosted data processing resource services. For disclosure purposes, a remote data processing resource can also be referred to as a server.

Figure 7:
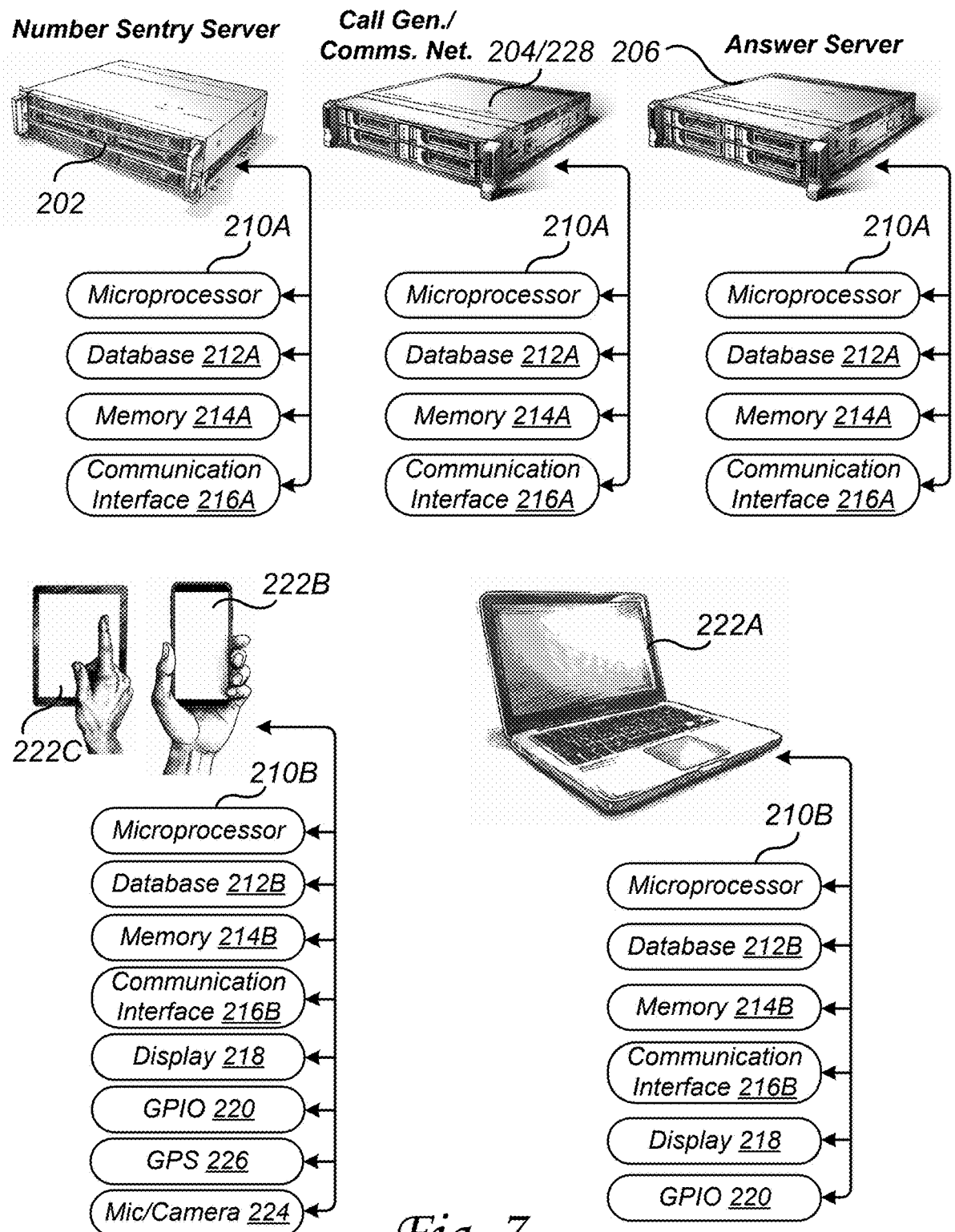
FIG. 7 illustrates examples of remote data processing resources and computing devices.

Referring to FIG. 7, there are illustrated examples of remote data processing resources and computing devices; In an exemplary embodiment, data processing resources 202/204/206/208/228 can comprise a microprocessor 210A, a database 212A, memory 214A, and a communication interface 216A. The microprocessor 210A can be operationally related to database 212A, memory 214A, and communication interface 216A.

The microprocessor 210A can be INTEL, ZILOG, MICROCHIP, AMD, ARM, and/or other types or kinds of microprocessors.

The database 212A can be SQL, MYSQL, MARIADB, ORACLE, MS ACCESS, network accessible storage, flat files, a combination thereof, or other types and kinds of databases.

The memory 214A can be a combination of RAM, ROM, flash, hard drives, solid-state drives, USB flash drives, micro-SD cards, or other types of removable memory, and/or other types and kinds of memory.

The communication interfaces 216A can be LAN, WAN, USB, Ethernet, RS232, RS485, serial, Wi-Fi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

In operation, computing devices 222A/222B/222C which can be referred to as computing devices 222, and other data communicating devices can data communicate with remote data processing resources 202/204/206/208 and utilize data storage resources such as database 212A. Such remote data processing resources 202/204/206/208 can be servers or other types and kinds of data processing resources. Furthermore, computing devices 222, remote data processing resources 202/204/206/208, and other types and/or kinds of data communicating devices can data communicate over a global network 250. The global network 250 can be the Internet and other added network elements of a communication network.

The computing devices 222 can comprise a microprocessor 210B, a database 212B, memory 214B, a communication interface 216B, a display 218, and a plurality of general-purpose inputs and outputs (GPIO) 220. Additionally, and as better illustrated in at least FIG. 7, the mobile type of computing device 222 (tablets 222C, smartphones 222B, and others) can comprise a global positioning system (GPS) 226, and a microphone and/or camera 224. In general, computing devices 222 can be configured with other functions and features, as may be required and/or desired in a particular embodiment.

In an exemplary embodiment, the microprocessor 210B can be operationally related to database 212B, memory 214B, communication interface 216B, display 218, GPIO 220, and if equipped with GPS 226, and microphone and/or camera 224. Computing devices 222 each rely on a suitable power source which can include a rechargeable battery, external power supply, or other types and/or kinds of power sources.

Microcontroller 210B can be INTEL, ZILOG, MICROCHIP, AMD, ARM, and/or other types or kinds of microprocessors.

Database 212B can be SQL, MYSQL, MARIADB, ORACLE, MS ACCESS, network-accessible storage, flat files, a combination thereof, or other types and kinds of databases.

Memory 214B can be a combination of RAM, ROM, flash, hard drives, solid-state drives, USB flash drives, micro-SD cards, or other types of removable memory, and/or other types and kinds of memory.

The communication interfaces 216B can be LAN, WAN, USB, Ethernet, RS232, RS485, serial, Wi-Fi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

Display 218 can be a liquid crystal display (LCD), light emitting diode (LED), organic light emitting diode (OLED), or other types and kinds of displays.

The general-purpose inputs and outputs (GPIO) 220 can be TTL, CMOS, MOSFET, transistors, buffers, relays, push-buttons, switches, and/or other types and kinds of GPIO circuits. In an exemplary embodiment, some of the GPIO 220 lines can be used to drive a touch screen input, biometric input devices, keyboards, and or types and kinds of computing device input devices.

Global positioning system (GPS) device 226 can be used to determine the geographic location of users 402, consumers 404, and call receiving test racks 406 who are carrying or have installed a computing device 222 equipped with a GPS 226. In this regard, such computing devices 222 are typically mobile computing devices such as tablets 222C, smartphones 222B, and other similar types and/or kinds of mobile computing devices 222.

In an exemplary embodiment, microphone and/or camera 224 can be used to record audio, and video, and take pictures such as in computing devices 222B and 222C.

Figure 8:
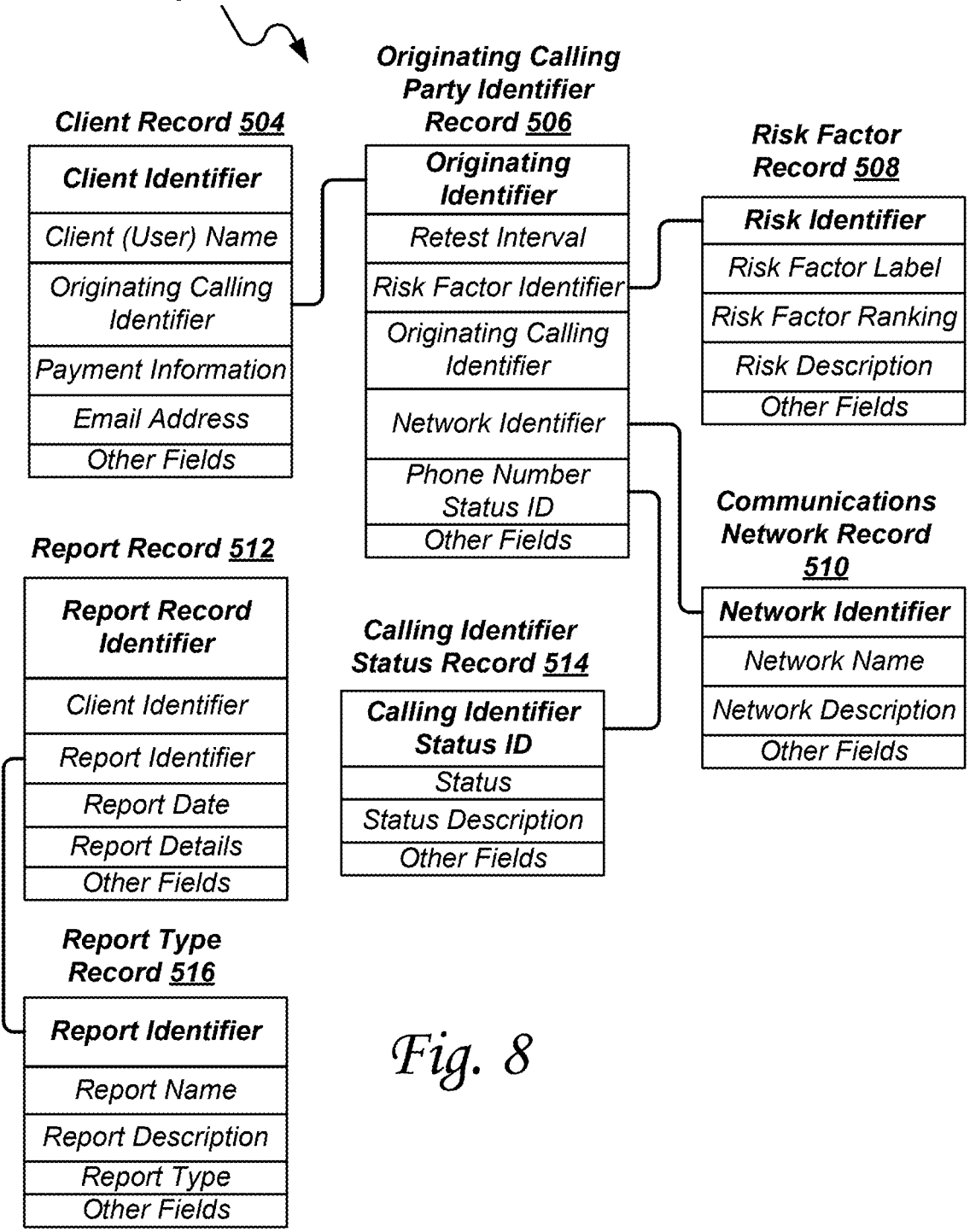
FIG. 8 illustrates one example of a database structure for the systems and methods of the present invention.

Referring to FIG. 8, there is illustrated one example of a database structure for the systems and methods of the present invention. In an exemplary embodiment, at least one database 212A/212B can be implemented on at least one of the data processing resources 202/204/206/208, or computing device 222. In operation, such one or more databases 212A/212B can be accessed/created/managed/maintained as appropriate and authorized by more than one stakeholder. In this regard, in addition to system administrators and other authorized persons, other stakeholders can access/create/manage/maintain as appropriate at least parts of the managing brand identity, brand security, and brand reputation system databases including users 402 and selectively consumers 404 as appropriate and authorized.

In an exemplary embodiment, such databases 212A/212B can be SQL, MYSQL, MARIADB, ORACLE, MS ACCESS, network-accessible storage, flat files, a combination thereof, or other types and kinds of databases. In an exemplary embodiment, the managing brand identity, brand security, and brand reputation database 502 can comprise a series of tables, records, fields, and accounts that include client record 504, originating calling party identifier record 506, risk factor record 508, communications network record 510, report record 512, calling identifier record 514, report type record 516, and/or other types or kinds of records as may be required and/or desired in a particular embodiment. The interconnecting lines between certain fields within certain records 506/506/508/510/512/514/516 illustrate the data relationships between some of the fields and records.

In operation, client record 504 can comprise client identifiers, client names, originating calling identifiers, payment information, email addresses, and other fields. The originating calling party identifier record 506 can comprise an originating identifier, retest interval, risk factor identifier, originating calling identifier, network identifier, phone number status ID, and other fields. The risk factor record 508 can comprise a risk identifier, risk factor label, risk factor ranking, risk description, and other fields. The communications network record 510 can comprise a network identifier, network name, network description, and other fields. The report record 512 can comprise a report record identifier, client identifier, report identifier, report date, report details, and other fields. The calling identifier status record can comprise a call identifier status ID, status, status description, and other fields. The report type record 516 can comprise a report identifier, report name, report description, report type, and other fields.

Figure 9:
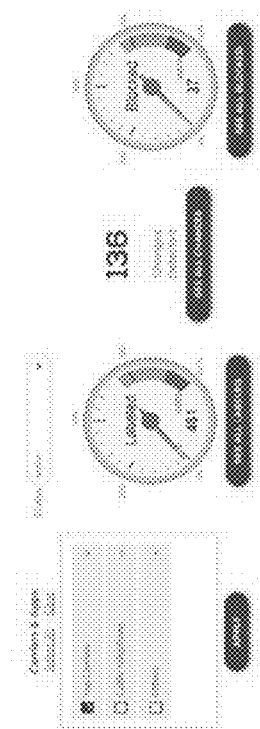

Referring to FIG. 9, there is illustrated one example of a user 402 interface screenshot 602. In an exemplary embodiment, a summary of the most recent originating calling party identifier tests can be displayed in a dashboard summary. Additionally, a weekly history can be displayed.

Figure 10:
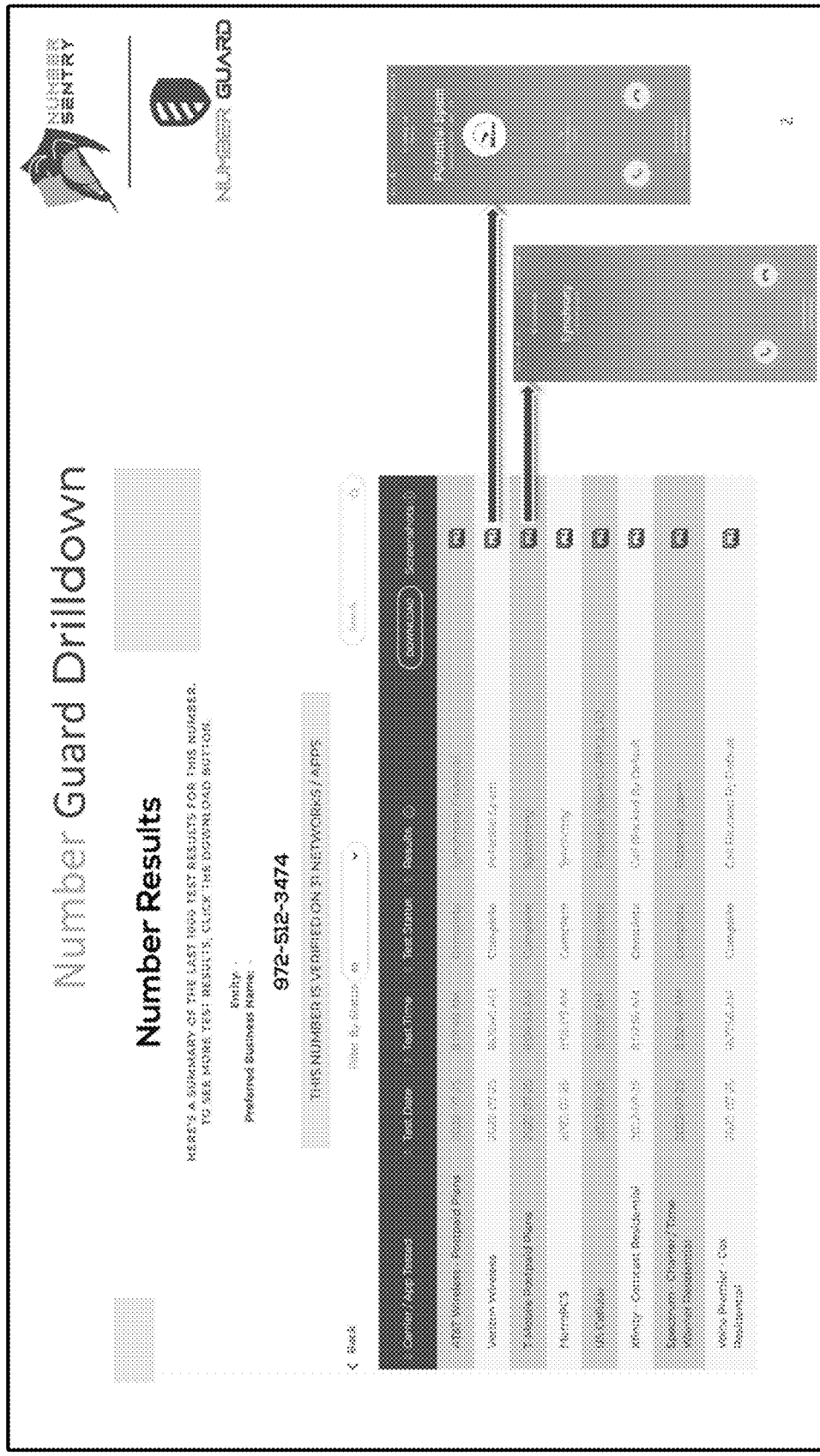

Referring to FIG. 10, there is illustrated one example of a user 402 interface screenshot 604. In an exemplary embodiment, an originating calling party identifier such as a phone number results screen can be displayed. Such a results screen informs user 402 of the test results for at least one of the originating calling party identifiers.

Referring to FIG. 11, there is illustrated one example of an information screenshot 606. In an exemplary embodiment, a plurality of information screens such as the brand scan information screen illustrated in FIG. 11 can be accessible to user 402 to aid in understating how results and other activities are organized, reported, scored, or otherwise analyzed. In this regard, as an example and not a limitation, a Brand Scan information screen can be displayed to a user 402 as follows:

"Brand Scans help you measure how your Business Name is being displayed on the mobile phones that you call. Each of your DID numbers is checked for the Business Name that is being displayed on each of your tested network carriers and software applications. Then, a Match Score is assigned describing how close the Displayed Business Name is to the Preferred Business Name entered on the Manage Numbers page. The Match Scores are:

Perfect Match. The Displayed Business Name is an exact match to the Preferred Business Name.

Near Perfect Match. The Displayed Business Name has spacing or capitalization variations.

Brand Variation. The Displayed Business Name includes abbreviations or other variations of your Preferred Business Name.

Incorrect Branding. The Displayed Business Name shows the type of business, a tag, or another result that is related to the business but is not your Preferred Business Name.

Unrelated Result. The Displayed Business Name is not directly related to the Preferred Business Name. This may include displaying the city or state.

No Brand Present. No Business Name is displayed. Usually, only the calling phone number is being displayed."

Figure 12:
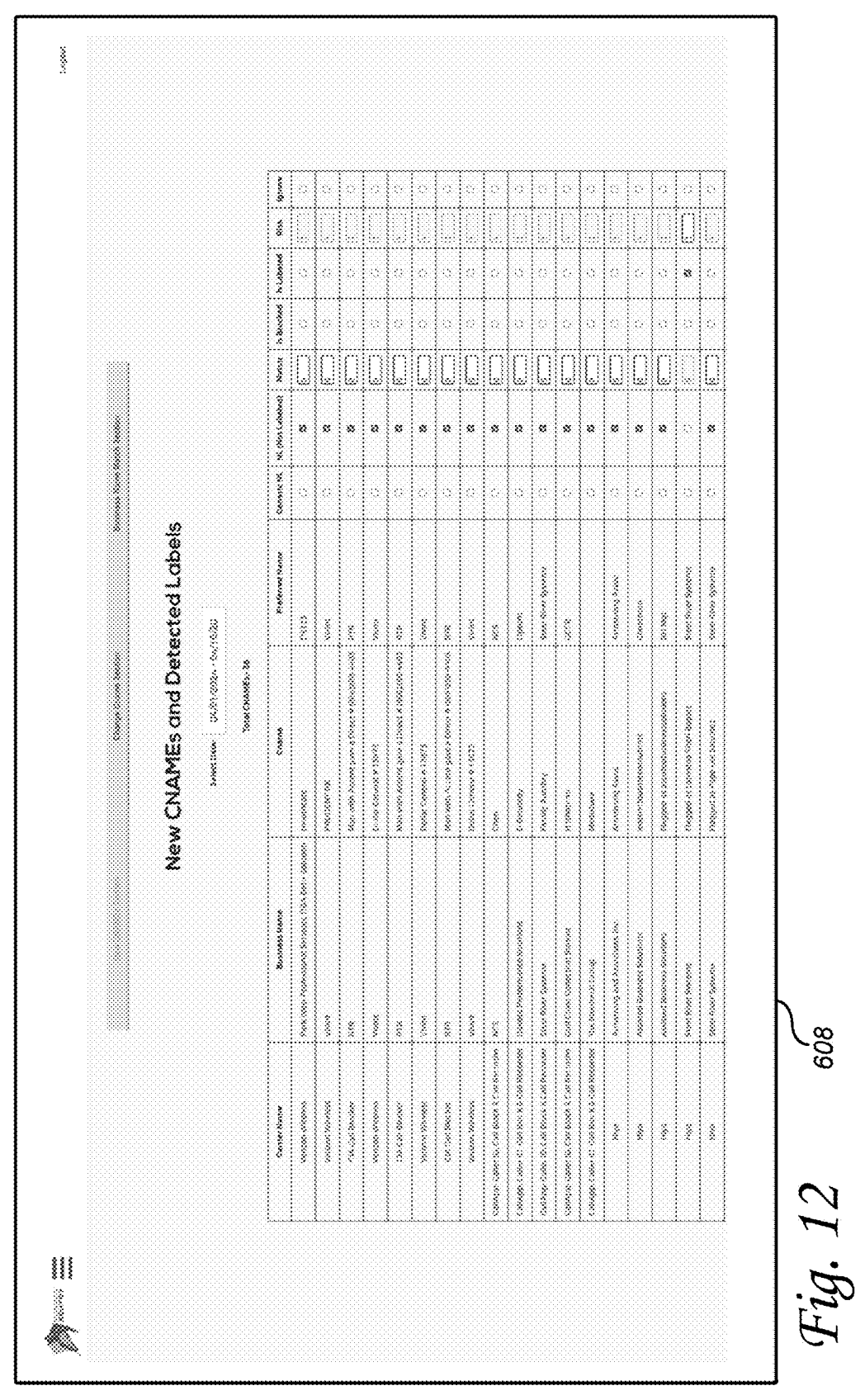

Referring to FIG. 12, there is illustrated one example of a report to assign risk factors and brand match scores to call reputation data screenshot 608. In an exemplary embodiment, changes in the calling names (CNAMES) and detected labeling can be tracked and displayed. Such changes can aid a user or other authorized person in quickly understanding which labels have changed for which of the originating calling party identifiers.

Figure 13:
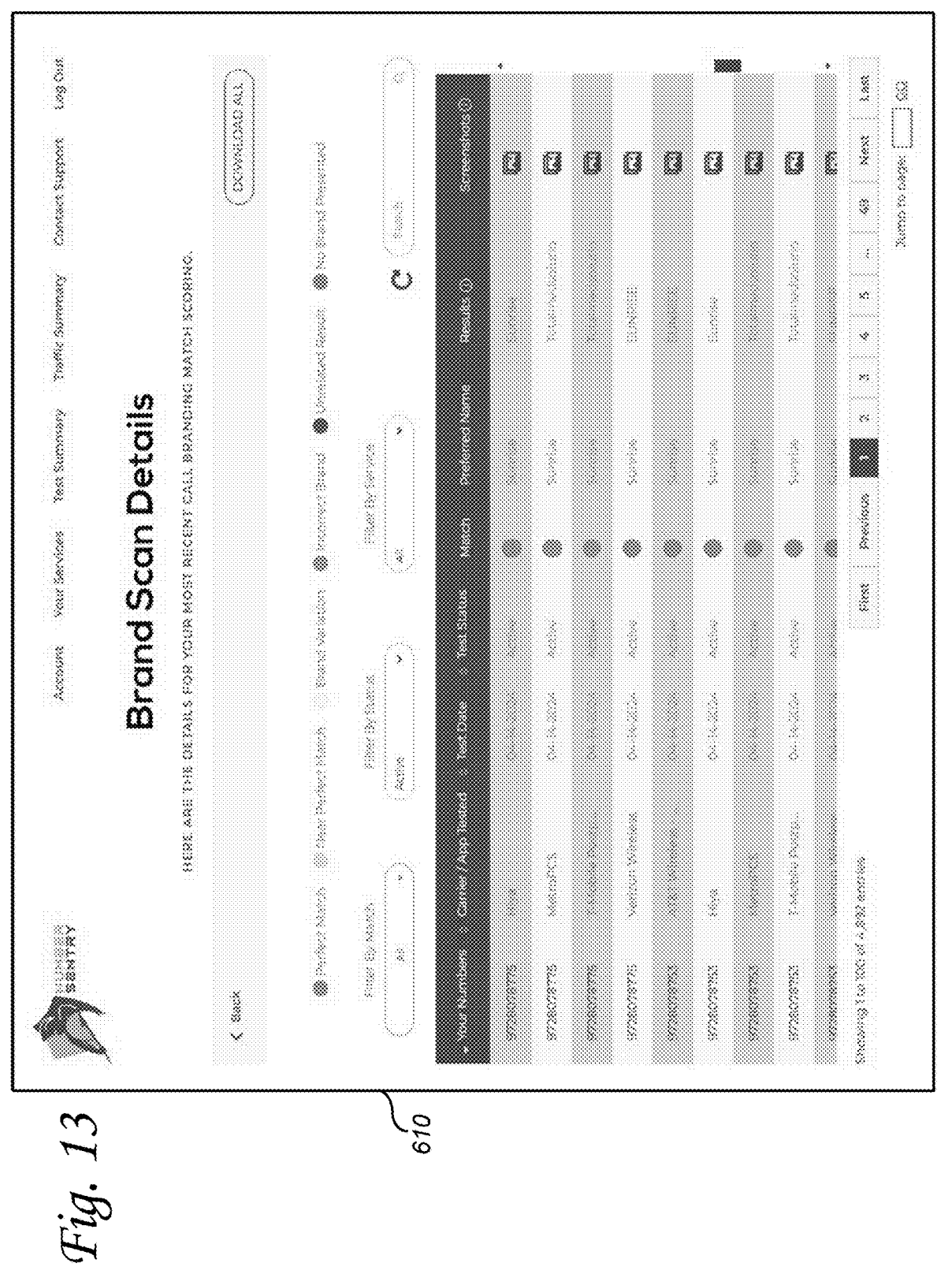

Referring to FIG. 13, there is illustrated one example of a user 402 interface screenshot 610. In an exemplary embodiment, brand scan details can be tracked and summarized on a report that is accessible and downloadable to user 402 and other authorized persons.

Figure 14:
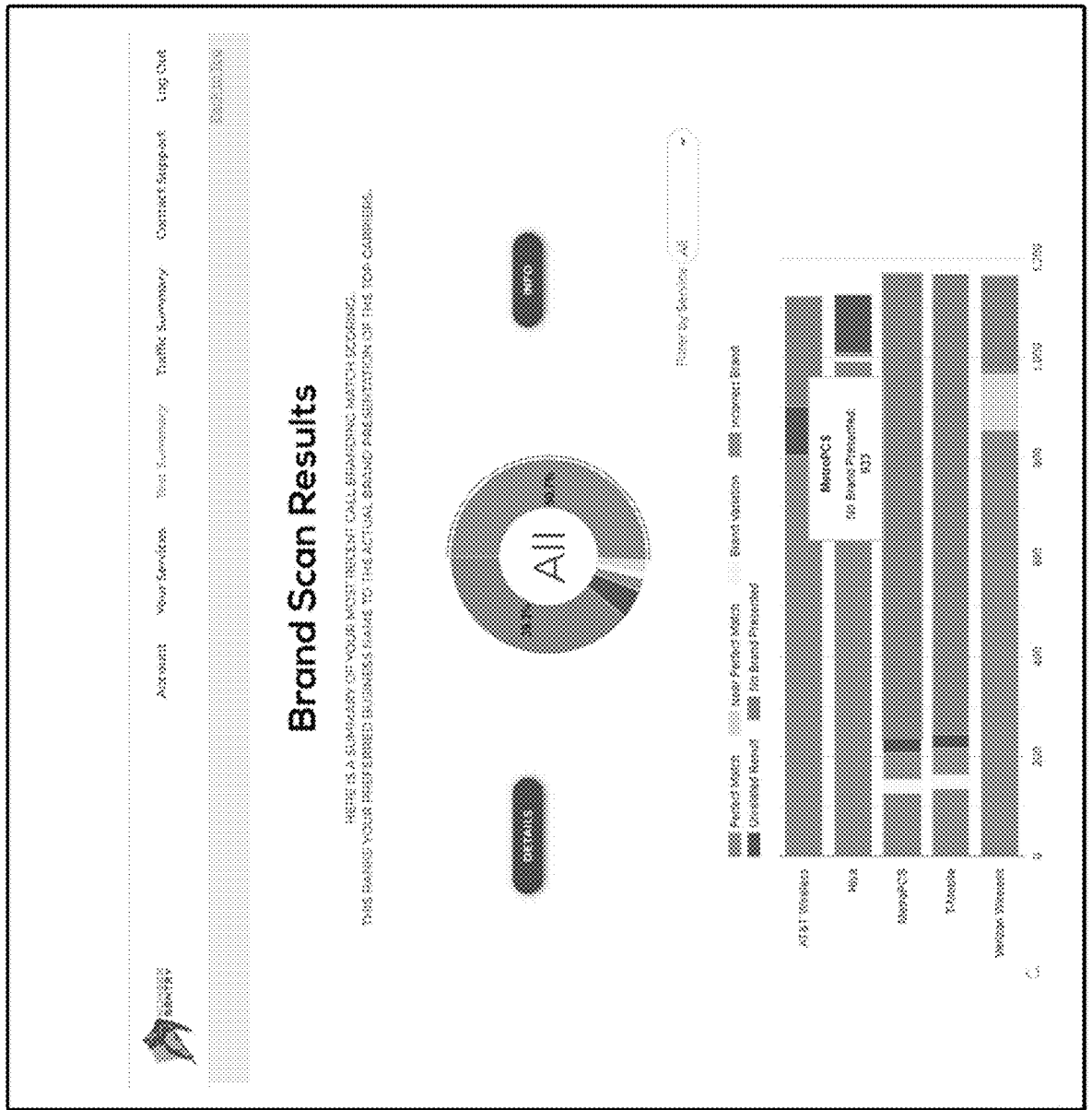
Figure 15:
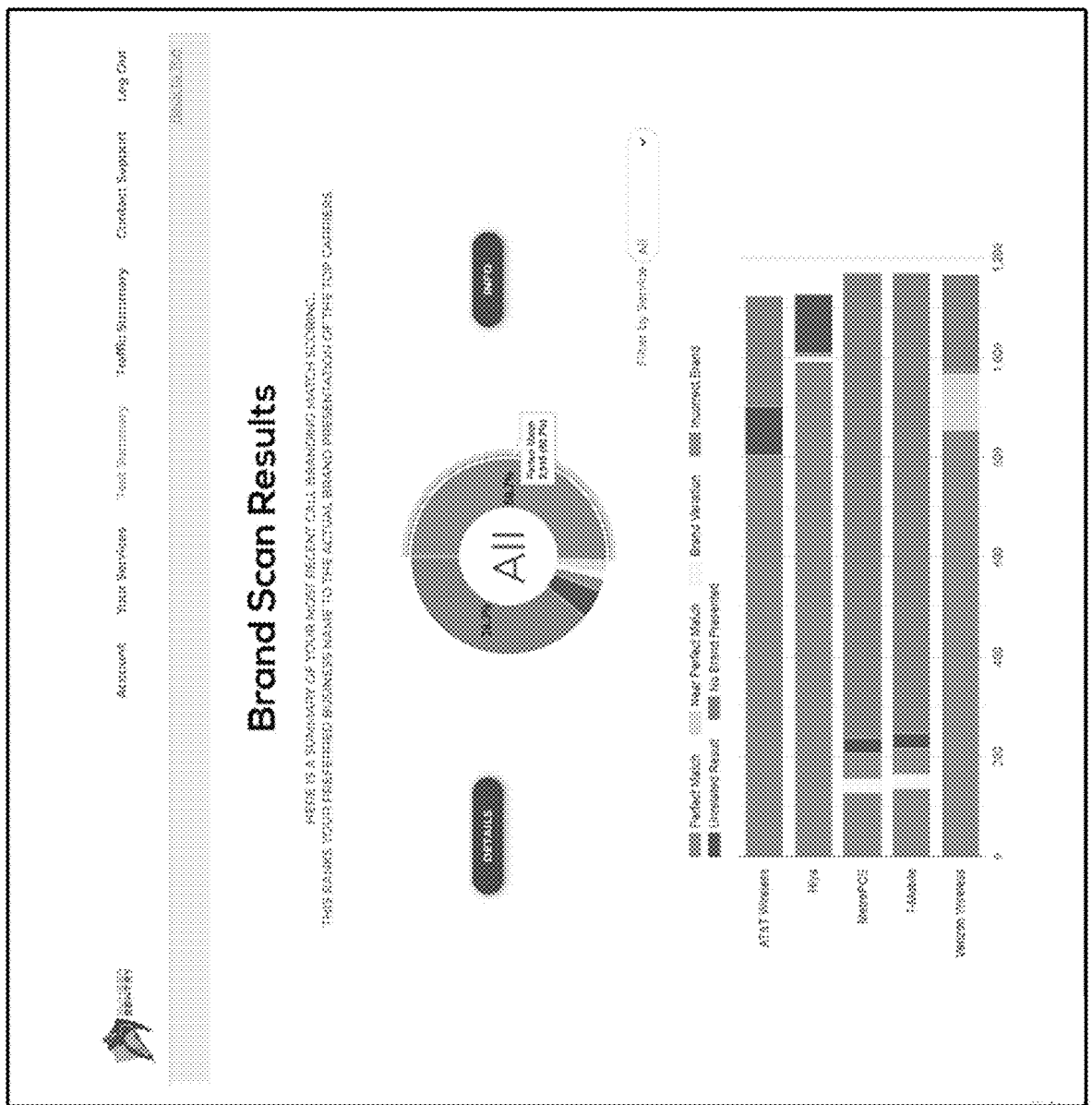

Referring to FIGS. 14 and 15, there is illustrated one example of a user 402 interface screenshots 612 and 614. In an exemplary embodiment, brand scan results can be tracked and summarized on a report that is accessible and downloadable to user 402 and other authorized persons.

Figure 16:
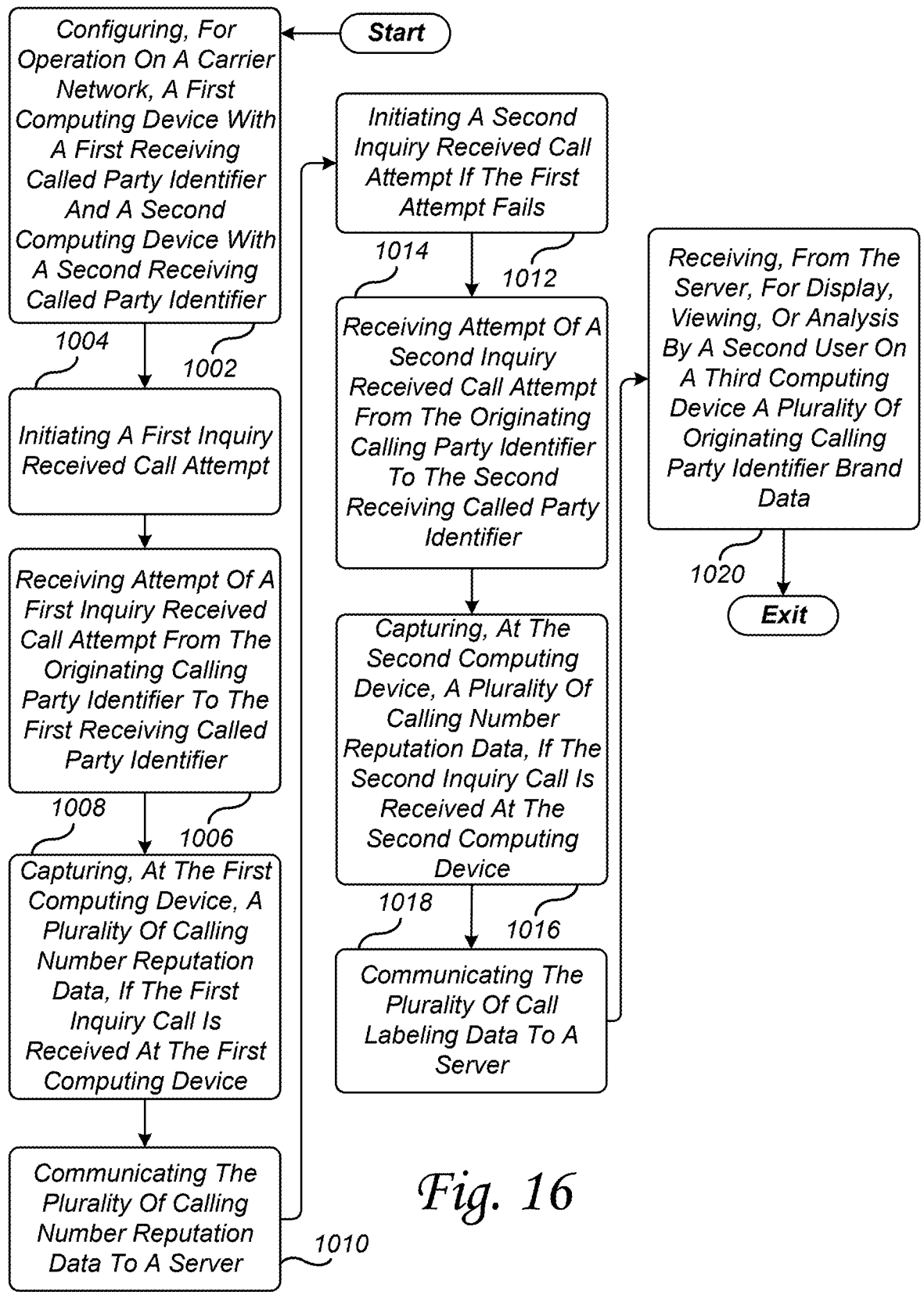
FIGS. 16-18 illustrate examples of a method of managing an organization's brand identity, brand security, and brand reputation delivered by a communications network by monitoring calling party reputation data associated with an originating calling party identifier used on the communications network.

Referring to FIG. 16, there is illustrated one example of a method of managing a brand identity, brand security, and brand reputation. In an exemplary embodiment, a method of managing an organization's brand identity, brand security, and brand reputation delivered by a communications network by monitoring calling party reputation data associated with an originating calling party identifier used on the communications network begins in step 1002 by configuring by a user 402 or identifying a previously configured at least one of a first computing device with a first receiving called party identifier and at least one of a second computing device with a second receiving called party identifier, for operation on a communications network.

The method continues in step 1004 by initiating a first inquiry call attempt and continues in steps 1006, 1008, and 1010. In this regard, the method continues in step 1006 by receiving the first inquiry call attempt with the originating calling party identifier at the first receiving called party identifier. The first inquiry call attempt is initiated by a server 202 data communicating with a call generation server 204. The call generation server effectuates the first inquiry call attempt, by way of a communications network 228, and sends a first attempt acknowledgment and data to server 202 indicating the first inquiry call attempt was attempted.

The method continues in step 1008 by capturing, at the first computing device 222B, a plurality of calling party reputation data, if the first inquiry call attempt is received at the first computing device 222B.

The method continues in step 1010 by data communicating, by way of the first computing device, the plurality of calling party reputation data to the server 202, if the plurality of calling party reputation data is successfully captured by the first computing device.

The method continues in step 1012 by initiating a second inquiry call attempt if the first inquiry call attempt is not successfully captured and continues in steps 1014, 1016, and 1018. In this regard, the method continues in step 1014 by receiving the second inquiry call attempt with the originating calling party identifier at the second receiving called party identifier. The second inquiry call attempt is initiated by the server 202 data communicating with the call generation server 204. The call generation server 204 effectuates the second inquiry call attempt and sends a second attempt acknowledgment and data to server 202 indicating the second inquiry call attempt was attempted.

The method continues in step 1016 by capturing, at the second computing device, the plurality of calling party reputation data, if the second inquiry call is received at the second computing device.

The method continues in step 1018 by communicating, by way of the second computing device 222B, the plurality of calling party reputation data to a server 202, if the plurality of calling party reputation data is successfully captured by the second computing device 222B.

The method continues in step 1020 by receiving, from the server 202, for display, viewing, or analysis by a second user 402 on a third computing device 222A, 222B, or 222C, a plurality of originating calling party identifier brand data associated with the originating calling party identifier as provided by the server and based in part on the plurality of calling party reputation data received from the first computing device, or from the second computing device, and selectively data received from the call generation server, the communications network, an answer server, or an artificial intelligence (AI) information service. The method is then exited.

Figure 17:
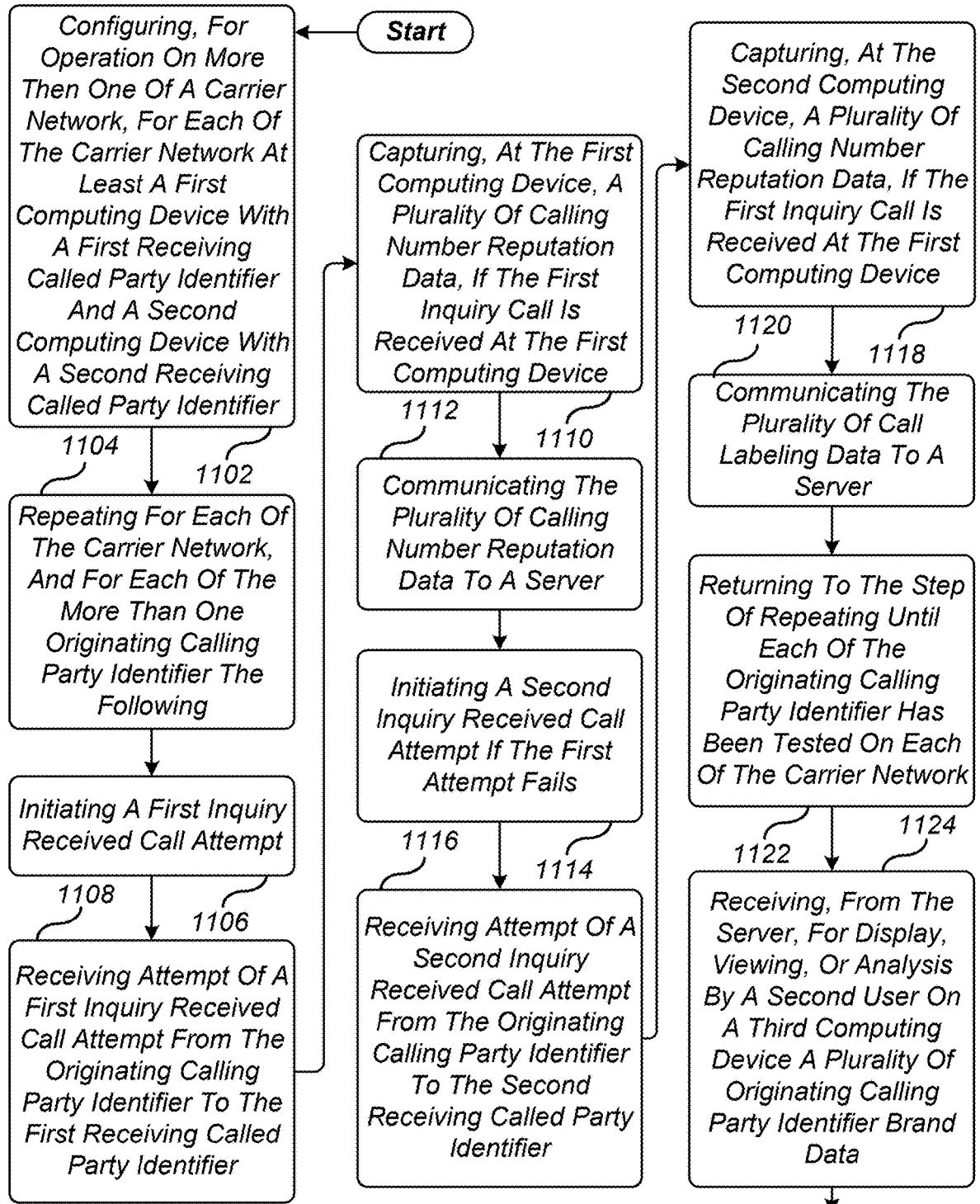

Referring to FIG. 17, there is illustrated one example of a method of managing an organization's brand identity, brand security, and brand reputation delivered by a communications network by monitoring calling party reputation data associated with an originating calling party identifier used on the communications network. In an exemplary embodiment, the method begins in step 1102 by configuring by a user or identifying as previously configured at least one of a first computing device with a first receiving called party identifier and at least one of a second computing device with a second receiving called party identifier, for operation on each of more than one of a communications networks.

The method continues in step 1104 by repeating for each of the communications networks and for each of more than one originating calling party identifiers in the following steps 1106, 1108, 1110, 1112, 1114, 1116, 1118, 1120, and 1122.

The method continues in step 1106 by initiating a first inquiry call attempt and continues in steps 1108, 1110, and 1112.

The method continues in step 1108 by receiving the first inquiry call attempt with the originating calling party identifier at the first receiving called party identifier. The first inquiry call attempt is initiated by a server 202 data communicating with a call generation server 204. The call generation server 204 effectuates the first inquiry call attempt, by way of communications network 228, and sends a first attempt acknowledgment and data to server 202 indicating the first inquiry call attempt was attempted.

The method then continues in step 1110 by capturing, at the first computing device 222B, a plurality of calling party reputation data, if the first inquiry call attempt is received at the first computing device 222B.

The method continues in step 1112 by communicating, by way of the first computing device 222B, the plurality of calling party reputation data to the server 202, if the plurality of calling party reputation data is successfully captured by the first computing device 222B.

The method continues in step 1114 by initiating a second inquiry call attempt if the first inquiry call attempt fails in steps 1116, 1118, and 1120.

The method continues in step 1116 by receiving the second inquiry call attempt with the originating calling party identifier at the second receiving called party identifier. The second inquiry call attempt is initiated by the server 202 data communicating with the call generation server 204. The call generation server 204 effectuates the second inquiry call attempt, by way of a communications network 228, and sends a second attempt acknowledgment and data to the server indicating the second inquiry call attempt was attempted.

The method continues in step 1118 by capturing, at the second computing device 222B, the plurality of calling party reputation data, if the second inquiry call is received at the second computing device 222B.

The method continues in step 1120 by communicating, by way of the second computing device 222B, the plurality of calling party reputation data to a server 202, if the plurality of calling party reputation data is successfully captured by the second computing device 222B.

The method continues in step 1122 by returning to the step of repeating the method until each of the originating calling party identifiers has been tested on each of the communications networks.

The method continues in step 1124 by receiving, from the server 202, for display, viewing, or analysis by a second user 402 on a third computing device 222A, 222B, or 222C, a plurality of originating calling party identifier brand data associated with the originating calling party identifier as provided by the server and based in part on the plurality of calling party reputation data received from the first computing device, or from the second computing device, and selectively data received from the call generation server, the communications network, an answer server, or an artificial intelligence (AI) information service. The method is then exited.

Figure 18:
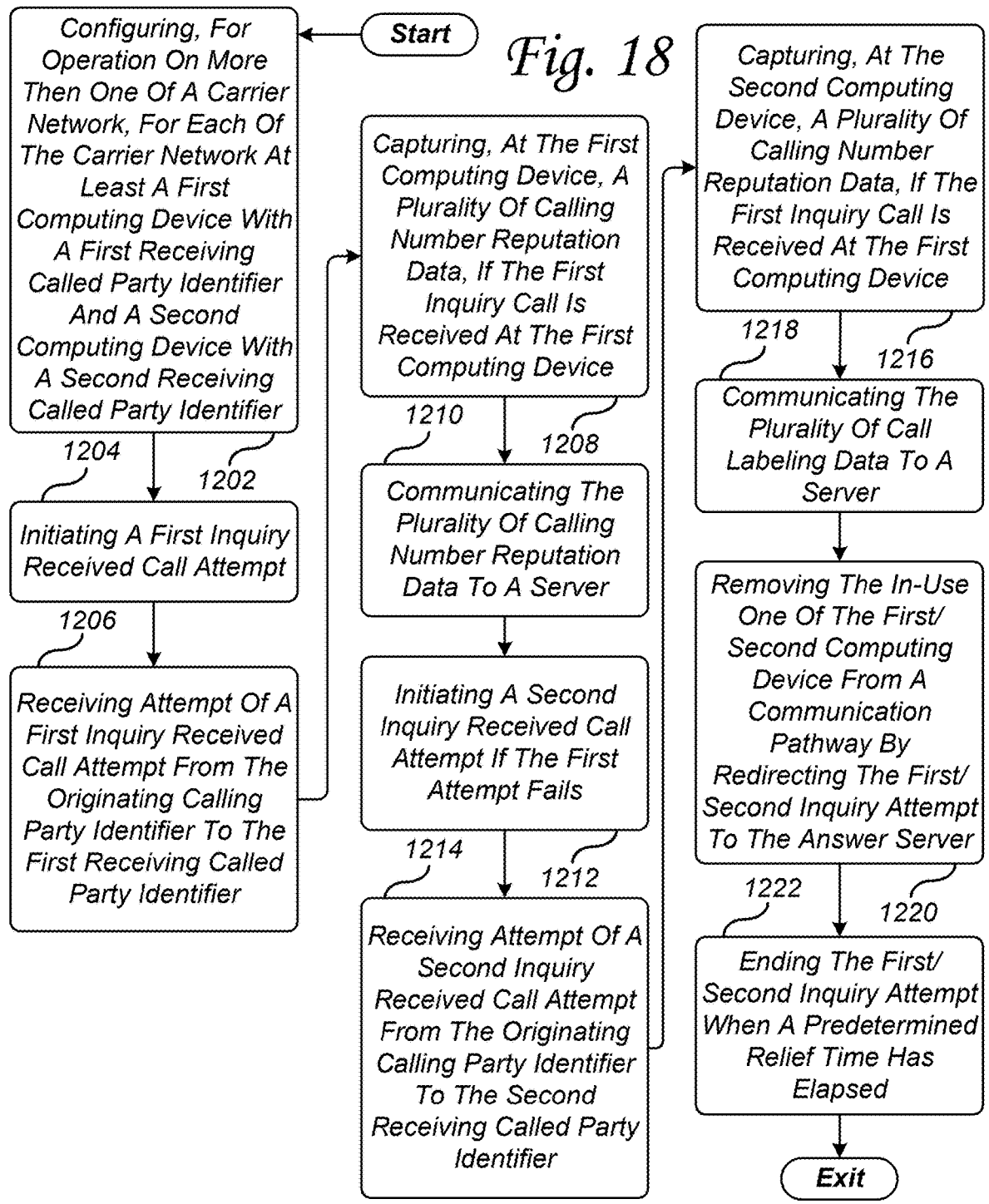

Referring to FIG. 18, there is illustrated one example of a method of managing an organization's brand identity, brand security, and brand reputation delivered by a communications network by monitoring calling party reputation data associated with an originating calling party identifier used on the communications network. In an exemplary embodiment, the method begins in step 1202 by configuring by a user 402 or identifying a previously configured at least one of a first computing device 222B with a first receiving called party identifier and at least one of a second computing device 222B with a second receiving called party identifier, for operation on a communications network.

The method continues in step 1204 by initiating a first inquiry call attempt and continues in steps 1206, 1208, and 1210 as follows:

The method continues in step 1206 by receiving the first inquiry call attempt with the originating calling party identifier at the first receiving called party identifier. The first inquiry call attempt is initiated by a server 202 data communicating with a call generation server 204. The call generation server 204 effectuates the first inquiry call attempt, by way of communications network 228, and sends a first attempt acknowledgment and data to server 202 indicating the first inquiry call attempt was attempted.

The method continues in step 1208 by capturing, at the first computing device 222B, a plurality of calling party reputation data, if the first inquiry call attempt is received at the first computing device 222B.

The method continues in step 1210 by communicating, by way of the first computing device 222B, the plurality of calling party reputation data to the server 202, if the plurality of calling party reputation data is successfully captured by the first computing device 222B.

The method continues in step 1212 by initiating a second inquiry call attempt if the first inquiry call attempt fails and continues in steps 1214, 1216, and 1218 as follows:

The method continues in step 1214 by receiving the second inquiry call attempt with the originating calling party identifier at the second receiving called party identifier. The second inquiry call attempt is initiated by the server 202 data communicating with the call generation server 204. The call generation server 204 effectuates the second inquiry call attempt, by way of communications network 228, and sends a second attempt acknowledgment and data to server 202 indicating the second inquiry call attempt was attempted.

The method continues in step 1216 by capturing, at the second computing device 222B, the plurality of calling party reputation data, if the second inquiry call is received at the second computing device 222B.

The method continues in step 1218 by communicating, by way of the second computing device 222B, the plurality of calling party reputation data to a server 202, if the plurality of calling party reputation data is successfully captured by the second computing device 222B.

The method continues is step 1220 by removing the in-use one of the first computing device 222B or the second computing device 222B from a communication path by redirecting the active one of the first inquiry call attempt or the second inquiry call attempt to the answering server 206.

The method continues in step 1222 by ending the active one of the first inquiry call attempt or the second inquiry call attempt when a relief time has elapsed.

In an exemplary embodiment, the relief time can be selected so the first or second call attempt is not construed by the communications networks as a negative indicator which may cause the originating caller identifier to be spam-tagged. In this regard, see the call and it is not answered and that could influence its decision to spam tag it.

In addition, and another exemplary embodiment, the relief time can be selected to meet telecommunication carrier service level agreements (SLAs). In this regard, to be a good partner regarding the calls made over the network.

Figure 19:
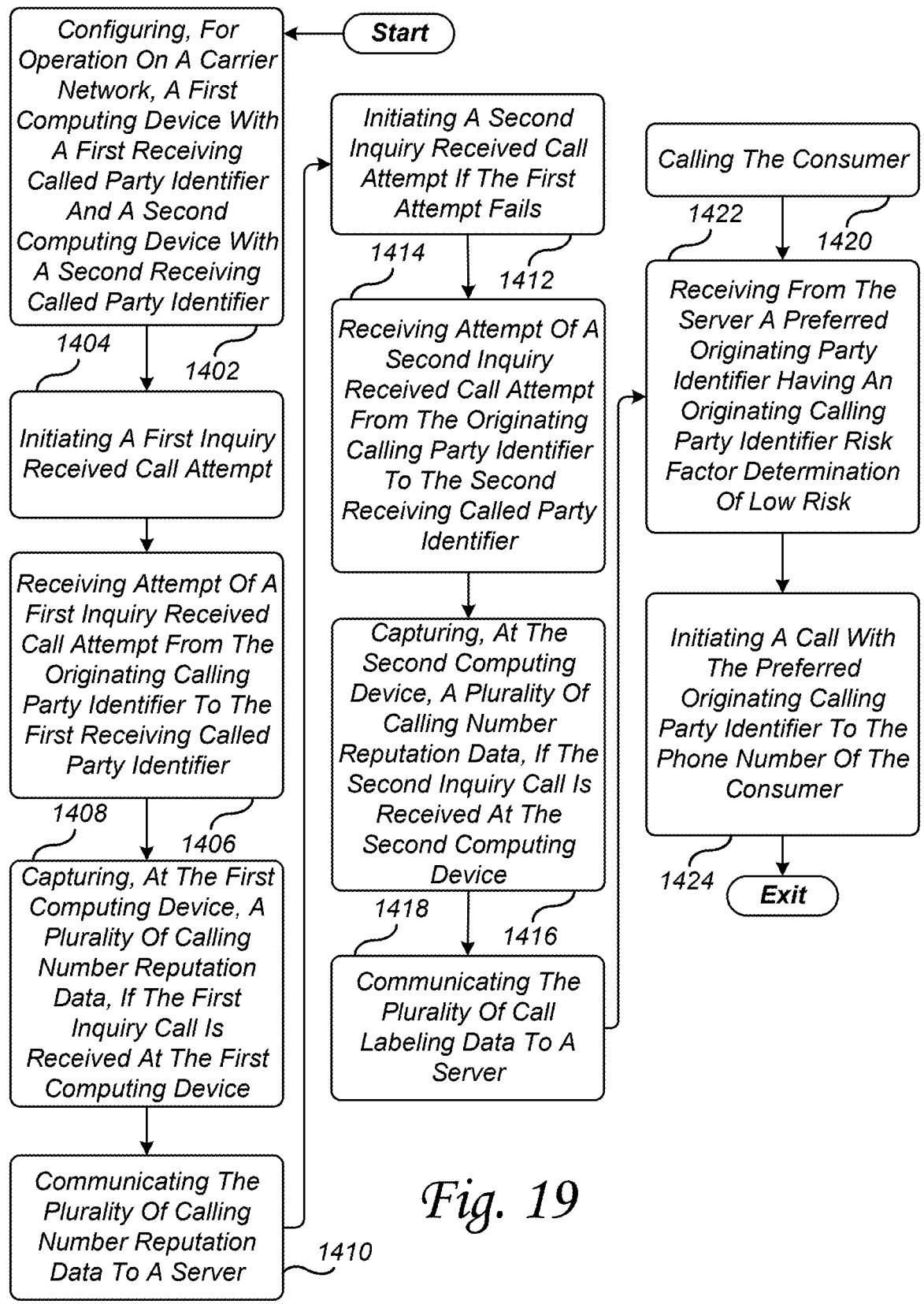
FIGS. 19-21 illustrate examples of a method of increasing call connections to consumers.

Referring to FIG. 19, there is illustrated one example of a method of increasing call connections to consumers. In an exemplary embodiment, the method begins in step 1402 by configuring by a user, for operation on a communications network, or identifying as previously configured, at least one of a first computing device with a first receiving called party identifier and at least one of a second computing device with a second receiving called party identifier.

The method continues in step 1404 by initiating a first inquiry call attempt and continues in steps 1406, 1408, and 1410. In this regard, the method continues in step 1406 by receiving the first inquiry call attempt with the originating calling party identifier at the first receiving called party identifier. The first inquiry call attempt is initiated by a server 202 data communicating with a call generation server 204. The call generation server effectuates the first inquiry call attempt, by way of a communications network 228, and sends a first attempt acknowledgment and data to server 202 indicating the first inquiry call attempt was attempted.

The method continues in step 1408 by capturing, at the first computing device 222B, a plurality of calling party reputation data, if the first inquiry call attempt is received at the first computing device 222B.

The method continues in step 1410 by data communicating, by way of the first computing device, the plurality of calling party reputation data to the server 202, if the plurality of calling party reputation data is successfully captured by the first computing device.

The method continues in step 1412 by initiating a second inquiry call attempt if the first inquiry call attempt is not successfully captured and continues in steps 1414, 1416, and 1418. In this regard, the method continues in step 1414 by receiving the second inquiry call attempt with the originating calling party identifier at the second receiving called party identifier. The second inquiry call attempt is initiated by the server 202 data communicating with the call generation server 204. The call generation server 204 effectuates the second inquiry call attempt, by way of a communications network 228, and sends a second attempt acknowledgment and data to server 202 indicating the second inquiry call attempt was attempted.

The method continues in step 1416 by capturing, at the second computing device, the plurality of calling party reputation data, if the second inquiry call is received at the second computing device.

The method continues in step 1418 by communicating, by way of the second computing device 222B, the plurality of calling party reputation data to a server 202, if the plurality of calling party reputation data is successfully captured by the second computing device 222B.

The method then continues in step 1420 by calling the consumer and continues in steps 1422 and 1424. In this regard, the method continues in step 1422 by receiving from the server, a preferred originating calling party identifier having an originating calling party identifier risk factor determination of a low risk, based, in part, on the plurality of calling party reputation data for the preferred originating calling party identifier. The method then continues in step 1424 by initiating a call using the preferred originating calling party identifier to the phone number of the consumer. The method is then exited.

Figure 20:
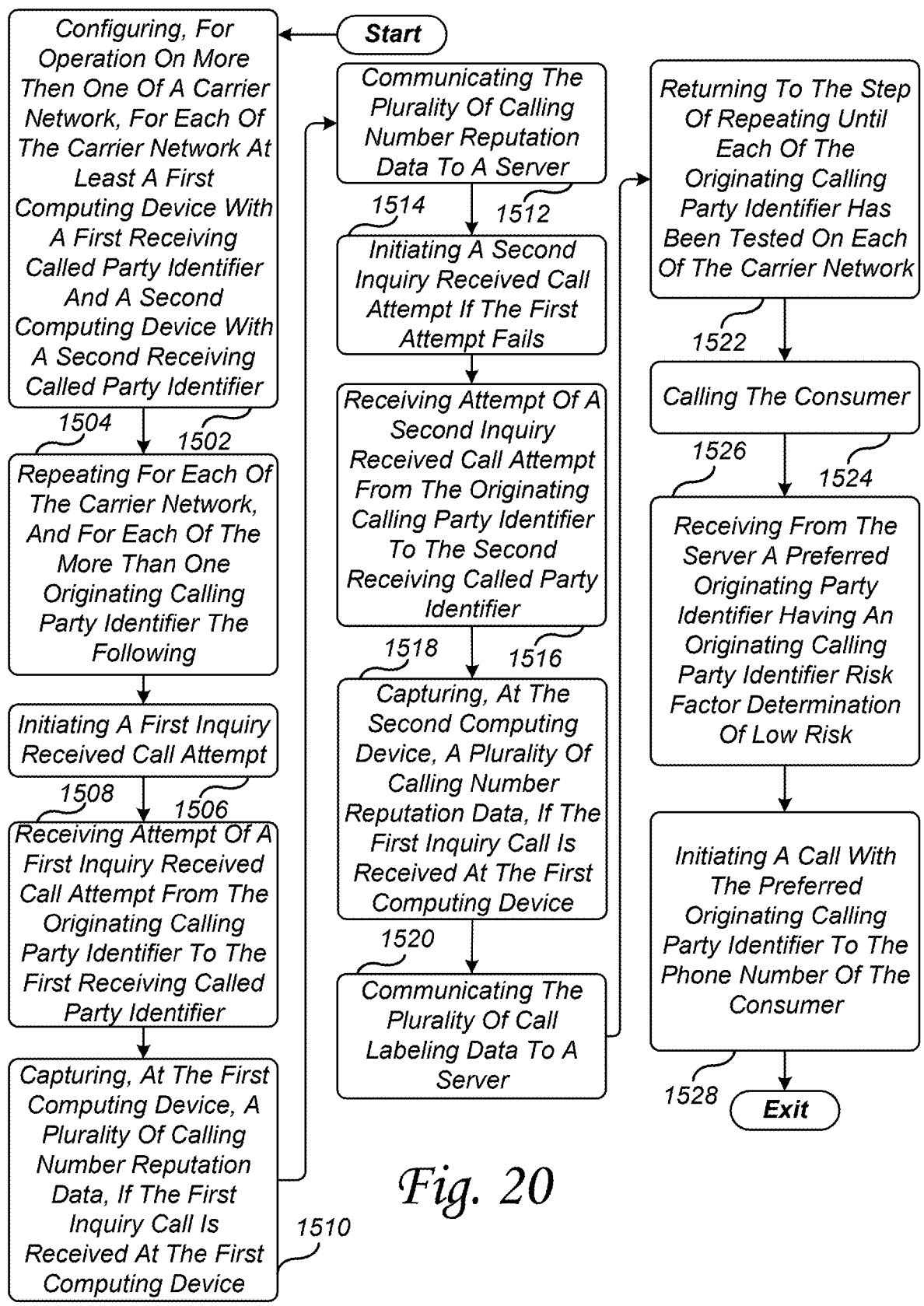

Referring to FIG. 20, there is illustrated one example of a method of increasing call connections to consumers. In an exemplary embodiment, the method begins in step 1502 by configuring for operation on more than one communications network. For each of the communications networks at least one first computing device is configured with a first receiving called party identifier and at least one second computing device is configured with a second receiving called party identifier. In the alternative, an existing suitable first computing device with a first receiving called party identifier, and at least one existing suitable second computing device with a second receiving called party identifier are identified for use on each of more than one communications network.

The method continues in step 1504 by repeating for each of the communications networks and for each of more than one originating calling party identifiers the following steps 1506, 1508, 1510, 1512, 1514, 1516, 1518, 1520, and 1522.

The method continues in step 1506 by initiating a first inquiry call attempt and continues in steps 1508, 1510, and 1512.

The method continues in step 1508 by receiving the first inquiry call attempt with the originating calling party identifier at the first receiving called party identifier. The first inquiry call attempt is initiated by a server 202 data communicating with a call generation server 204. The call generation server 204 effectuates the first inquiry call attempt, by way of a communications network 228, and sends a first attempt acknowledgment and data to server 202 indicating the first inquiry call attempt was attempted.

The method then continues in step 1510 by capturing, at the first computing device 222B, a plurality of calling party reputation data, if the first inquiry call attempt is received at the first computing device 222B.

The method continues in step 1512 by communicating, by way of the first computing device 222B, the plurality of calling party reputation data to the server 202, if the plurality of calling party reputation data is successfully captured by the first computing device 222B.

The method continues in step 1514 by initiating a second inquiry call attempt if the first inquiry call attempt fails in steps 1516, 1518, and 1520.

The method continues in step 1516 by receiving the second inquiry call attempt with the originating calling party identifier at the second receiving called party identifier. The second inquiry call attempt is initiated by the server 202 data communicating with the call generation server 204. The call generation server 204 effectuates the second inquiry call attempt, by way of a communications network 228, and sends a second attempt acknowledgment and data to the server indicating the second inquiry call attempt was attempted.

The method continues in step 1518 by capturing, at the second computing device 222B, the plurality of calling party reputation data, if the second inquiry call is received at the second computing device 222B.

The method continues in step 1520 by communicating, by way of the second computing device 222B, the plurality of calling party reputation data to a server 202, if the plurality of calling party reputation data is successfully captured by the second computing device 222B.

The method continues in step 1522 by returning to the step of repeating the method until each of the originating calling party identifiers has been tested on each of the communications networks.

The method then continues in step 1524 by calling the consumer and continues in steps 1526 and 1528. In this regard, the method continues in step 1526 by receiving from the server, a preferred originating calling party identifier having an originating calling party identifier risk factor determination of a low risk, based, in part, on the plurality of calling party reputation data for the preferred originating calling party identifier. The method then continues in step 1528 by initiating a call using the preferred originating calling party identifier to the phone number of the consumer. The method is then exited.

Figure 21:
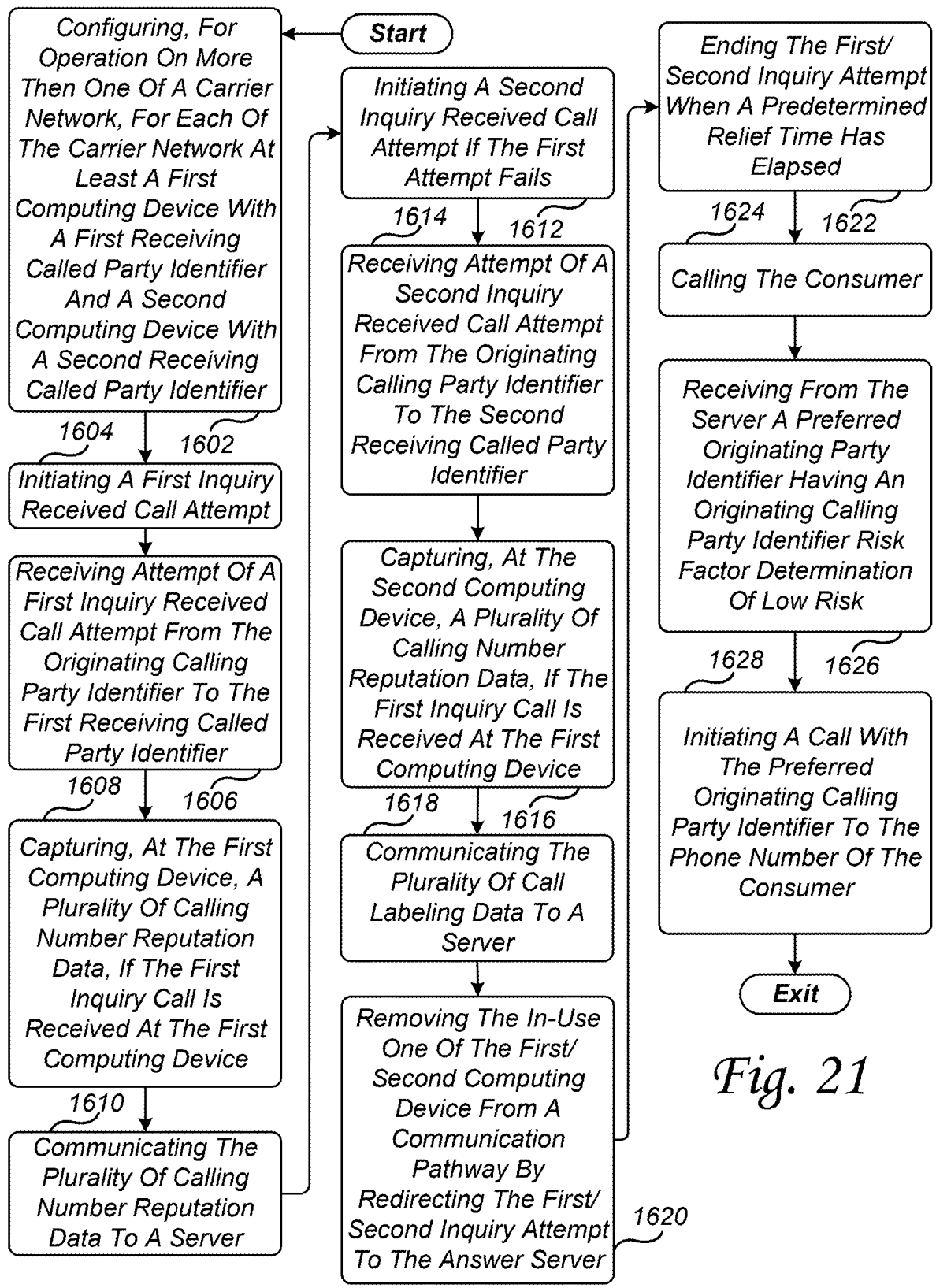

Referring to FIG. 21, there is illustrated one example of a method of increasing call connections to consumers. In an exemplary embodiment, the method begins in step 1602 by configuring by a user, for operation on more than one communications network, or identifying a suitable first computing device 222B with a first receiving called party identifier and a second computing device 222B with a second receiving called party identifier more than one communications network.

The method continues in step 1604 by initiating a first inquiry call attempt to the selected communications network and continues in steps 1606, 1608, and 1610 as follows:

The method continues in step 1606 by receiving the first inquiry call attempt with the originating calling party identifier at the first receiving called party identifier on the selected communications network. The first inquiry call attempt is initiated by a server 202 data communicating with a call generation server 204. The call generation server 204 effectuates the first inquiry call attempt to the selected device 222B on the selected communications network 228, by way of communications network 228, and sends a first attempt acknowledgment and data to the server 202 indicating the first inquiry call attempt was attempted.

The method continues in step 1608 by capturing, at the first computing device 222B on the selected communications network 228, a plurality of calling party reputation data, if the first inquiry call attempt is received at the first computing device 222B.

The method continues in step 1610 by communicating, by way of the first computing device 222B on the selected communications network 228, the plurality of calling party reputation data to the server 202, if the plurality of calling party reputation data is successfully captured by the first computing device 222B.

The method continues in step 1612 by initiating a second inquiry call attempt if the first inquiry call attempt fails and continues in steps 1614, 1616, and 1618 as follows:

The method continues in step 1614 by receiving the second inquiry call attempt with the originating calling party identifier at the second receiving called party identifier on the selected communications network 228. The second inquiry call attempt is initiated by the server 202 data communicating with the call generation server 204. The call generation server 204 effectuates the second inquiry call attempt to the selected device 222B on the selected communications network 228, by way of communications network 228, and sends a second attempt acknowledgment and data to server 202 indicating the second inquiry call attempt was attempted.

The method continues in step 1616 by capturing, at the second computing device 222B on the selected communications network 228, the plurality of calling party reputation data, if the second inquiry call is received at the second computing device 222B.

The method continues in step 1618 by communicating, by way of the second computing device 222B on the selected communications network 228, the plurality of calling party reputation data to a server 202, if the plurality of calling party reputation data is successfully captured by the second computing device 222B.

The method continues is step 1620 by removing the in-use one of the first computing device 222B or the second computing device 222B from the communication path by redirecting the active one of the first inquiry call attempt or the second inquiry call attempt to the answering server 206.

The method continues in step 1622 by ending the active one of the first inquiry call attempt or the second inquiry call attempt when a relief time has elapsed.

In an exemplary embodiment, the relief time can be selected so the first or second call attempt is not construed by the selected communications network 228 as a negative indicator which may cause the originating caller identifier to be spam tagged. In this regard, the selected communications network 228 may identify the call is not answered which could influence the decision to spam tag it.

In addition, and another exemplary embodiment, the relief time can be selected to meet telecommunication carrier service level agreements (SLAs). In this regard, to be a good partner regarding the calls made over the network.

The method then continues in step 1624 by calling the consumer and continues in steps 1626 and 1628. In this regard, the method continues in step 1626 by receiving from the server, a preferred originating calling party identifier having an originating calling party identifier risk factor determination of a low risk, based, in part, on the plurality of calling party reputation data for the preferred originating calling party identifier. The method then continues in step 1628 by initiating a call using the preferred originating calling party identifier to the phone number of the consumer. The method is then exited.

Figure 22:
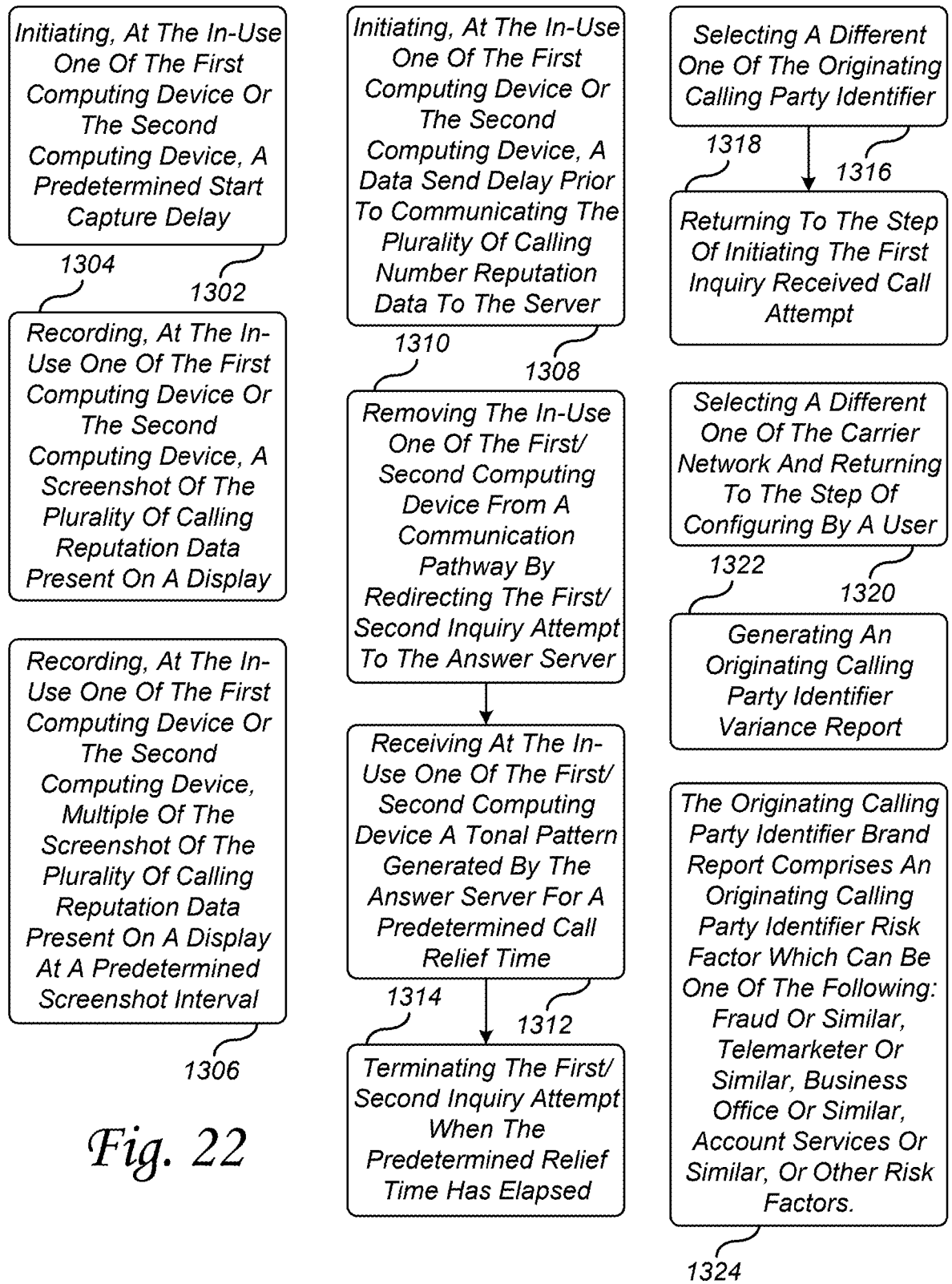
FIGS. 22-23 illustrate exemplary embodiments that can be interchangeably used with the method of the present invention.

Referring to FIG. 22, there are illustrated exemplary embodiments that can be interchangeably used with the method of the present invention.

In step 1302, initiating, at the in-use first computing device 222B or the in-use second computing device 222B, a start capture delay prior to the steps of capturing the plurality of calling party reputation data.

In an exemplary embodiment, the start capture delay inserts relief time between the receipt of the first inquiry call attempt at the first computing device and the capture of the plurality of calling party reputation data by the first computing device and between the receipt of the second inquiry call attempt at the second computing device and the capture of the plurality of calling party reputation data by the second computing device. In this regard, the start capture delay pauses the data capture long enough for all of the calling party reputation data to arrive on the handset before we start to capture it. Not enough pause and you start too early and do not get all the data. Wait too long to start data capture data and it may be gone by the time you want to capture it. The start delay is often influenced by the network or application being tested and the computing device you are using. In an exemplary embodiment, the start capture delay can range between 3,000 milliseconds and 10,000 milliseconds, or other ranges as may be required and/or desired in a particular embodiment.

In step 1322, recording, at the in-use one of the first computing device 222B or the second computing device 222B, a screenshot of the plurality of calling party reputation data present which may be presented on a display associated with the in-use the first computing device 222B or the second computing device 222B, wherein each of the first computing device and the second computing device comprise the display.

In an exemplary embodiment, the option of capturing a screenshot for visual presentation to the client can selectively be turned on/off. In operation, screenshots can provide visual evidence of what was displayed and in the process comfort users and clients that the test results reported are accurate. Screenshots also allow a client to put themselves in the shoes of their consumer—seeing the brand presentation exactly the way a real consumer would see their incoming call.

In step 1306, recording, at the in-use one of the first computing device 222B or the second computing device 222B, multiple screenshots at a screenshot time interval.

In an exemplary embodiment, the option of capturing one or multiple screenshots is a configurable setting, and, if electing to capture multiple screenshots, the option to set a pre-determined delay between the multiple screenshots is also a setting. In operation, as an example and not a limitation, if enabled screenshot capture can be set capture up to 5 screenshots at intervals of 500 milliseconds, or other number of screenshots and a different screenshot interval, as may be required and/or desired in a particular embodiment. The interval can be adjusted at the server 202 level and communicated to the computing device 222B or set directly at the computing device 222B.

In step 1308, initiating, at the in-use one of the first computing device 222B or the second computing device 222B, a send data delay prior to communicating the plurality of calling party reputation data to the server 202.

In an exemplary embodiment, the send data delay is a relief timer residing on the in-use one of the first computing device 222B or the second computing device 222B, providing a relief time interval between redirecting the active one of the first inquiry call attempt or the second inquiry call attempt to the answering server 206 and the initiation of data communication 306 to the number sentry server 202. In this regard, this feature is a data throttling mechanism that optimizes the number of call attempts a computing device 222B can receive during a given test period. When the computing device 222B sends calling party reputation data 306 to the server 202, the server 202 assumes the computing device 222B is ready for the next call and will immediately send another test call attempt to that computing device 222B. By adding a send data delay between the time the call was redirected to the answering server 206 and when the in-use one of the first computing device 222B or the second computing device 222B, sends data to the server 202, the velocity of test call attempts can be throttled to optimize a particular computing device's 222B performance. This can give the computing device 222B time to "recover". In operation, the send data delay can ranges between 3,000 milliseconds and 35,000 milliseconds, or other range, as may be required and/or desired in a particular embodiment.

In step 1310, removing the in-use one of the first computing device 222B or the second computing device 222B from a communication path by redirecting the in-use one of the first inquiry call attempt or the second inquiry call attempt to the answering server 206.

In an exemplary embodiment, once the call is redirected to the answering server 206, the in-use one of the first computing device 222B or the second computing device 222B can also be set to capture a post-call screenshot. If electing to capture a post-call screenshot, there can be an option to set a pre-determined delay between the call redirection to answering server 206 and the post-call screenshot. In this regard, some applications provide pertinent call information after the call has been declined/redirected. In these cases, the ability to capture a screenshot of this information after a post-capture delay interval is useful and that data can be sent to the server 202 for analysis. In operation, a post-capture delay can be in the range of 1,000 milliseconds, or other range, as may be required and/or desired in a particular embodiment. The method then moves to step 1312.

In step 1312, receiving and answering at the call answer server 206 the redirected call, and generating a tonal pattern for a relief time. The method then moves to step 1314.

In step 1314, terminating the in-use one of the first inquiry call attempt or the second inquiry call attempt when the relief time elapses.

In an alternative exemplary embodiment, after an inquiry call attempt is placed and the receiving computing device successfully captures the calling party reputation data, the receiving computing device is configured to manage the termination of the active inquiry call attempt through a software control message, specifically an application programming interface (API) command.

Once the receiving computing device has collected the calling party reputation data, the receiving computing device transmits an API command to the call generation server, instructing it to terminate the active inquiry call attempt.

This eliminates the need for an answer server to manage call terminations, simplifying the call termination process and reducing system latency.

Upon receiving the API command, the call generation server executes the termination of the active inquiry call attempt. The system ensures that the call termination process is executed in a controlled manner to prevent unintended disruptions, ensuring that all necessary data has been captured before termination.

In another alternative exemplary embodiment, the number sentry server may transmit a software control message, such as an API command, to the call generation server, instructing it to terminate the active inquiry call attempt, permitting dynamic adjustment of the timing of the software control message based on network conditions, data capture confirmation, or preconfigured wait periods to optimize termination efficiency. Additionally, logging and analytics functionalities can be integrated into the number sentry server to track software control message command execution and call termination responses, ensuring compliance with network performance metrics.

By employing this software control message-based termination method, the system improves call efficiency by:
  Reducing reliance on additional network components, such as an answer server;
  Minimizing call duration to prevent unnecessary network congestion;
  Streamlining data collection and processing before call termination;
  Enhancing system responsiveness by dynamically managing call termination based on captured reputation data.

This software control message-based termination approach is particularly beneficial for organizations that require rapid, automated call termination after capturing current call reputation data, allowing for a more adaptive and scalable call monitoring infrastructure.

In step 1316, selecting, at server 202, a different one of the originating calling party identifier. The method then moves to step 1318.

In step 1318, returning to the step of initiating the first inquiry call attempt, wherein the plurality of calling party reputation data of a plurality of the originating calling party identifier can be monitored.

In step 1320, selecting a different one of the communications network 228 and returning to the step of identifying or configuring by the user, for operation on the communications network 228. In operation, the plurality of calling party reputation data associated with the originating calling party identifier can be monitored on multiple communications networks 228.

In step 1322, generating, for review by the user, an originating calling party identifier variance report that identifies variances between prior collections of the plurality of calling party reputation data and the current collection of the plurality of calling party reputation data.

In step 1324, the originating calling party identifier brand identity data, brand security data, and brand reputation data comprise an originating calling party identifier risk factor. The originating calling party identifier risk factor is at least one of the following: a fraud risk or similar label is scored a high risk, a telemarketer or similar label is scored as a medium risk, or business office or account services or similar are scored a low risk. As desired or needed by a particular embodiment, such risk factors may be quantitatively based by applying a specific quantitative numerical risk score, or the risk factor may be qualitatively based such as assigning a high, medium, or low risk factor.

Figure 23:
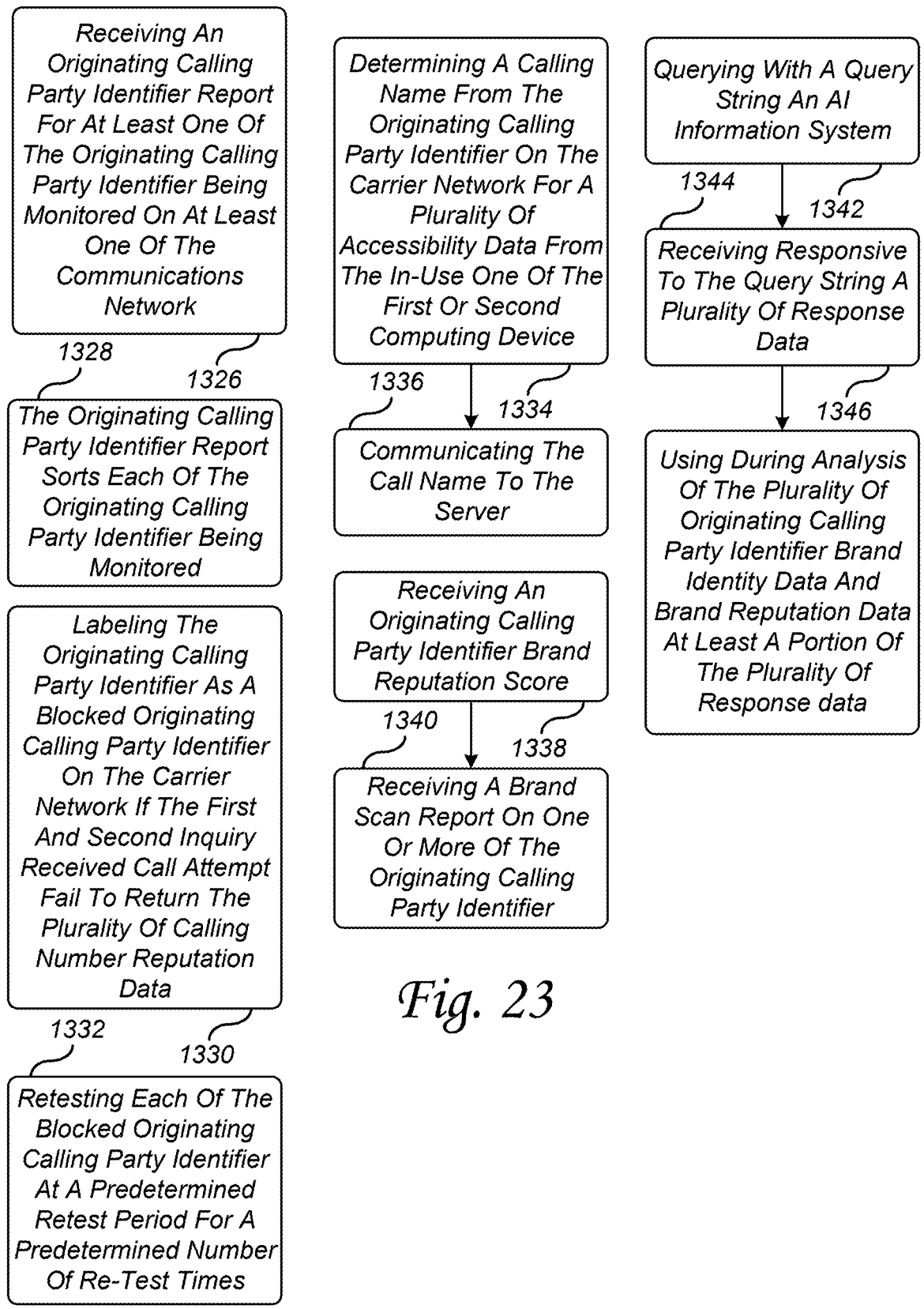

Referring to FIG. 23, there are illustrated exemplary embodiments that can be interchangeably used with the method of the present invention.

In step 1326, receiving, from server 202, an originating calling party identifier report for at least one of the originating calling party identifiers being monitored on at least one of the communications networks 228. The originating calling party identifier report comprises the originating calling party identifier risk factor, a summary of the plurality of calling party reputation data received, or other types and kinds of relevant information as may be required and/or desired in a particular embodiment.

In step 1328, the originating calling party identifier report sorts each of the originating calling party identifiers being monitored, based in part on the plurality of calling party reputation data received for the originating calling party identifier, for each of the communications networks 228 tested, into statuses that may include but are not limited to blocked, telemarketer, needs improvement, ready for use, or other relevant statuses as may be required and/or desired in a particular embodiment.

In step 1330, labeling, at server 202, the originating calling party identifier as a blocked originating calling party identifier on the communications network 228 if the first inquiry call attempt and the second inquiry call attempt failed to return the plurality of calling party reputation data.

In step 1332, retesting each of the blocked originating calling party identifiers at a predetermined retest period for a predetermined number of retest times on a different one of the receiving called party identifiers, on a different one of the first computing device, on the same one of the communications network 228, and returning to the step of initiating the first inquiry call attempt.

In step 1334, determining a calling name or presented brand identity of the originating calling party identifier on the communications network 228 from a plurality of call user interface data from the in-use one of the first computing device 222B or the second computing device 222B. The method then moves to step 1336.

In step 1336, data communicating the calling name or presented brand identity of the originating calling party identifier to server 202.

In step 1338, receiving, from the server 202, an originating calling party identifier brand identity data, brand security data, and brand reputation data based score, based in part, on the content of the calling name or presented brand identity of the originating calling party identifier and the communications network carrier. The method then moves to step 1340.

In step 1340, receiving, from server 202, a brand scan report based, in part, on one or more of the originating calling party identifier brand identity data, brand security data, and brand reputation data, from one or more of the originating calling party identifiers, that are monitored on one or more of the communications network 228. The brand scan report comprises at least one of the following: a summary brand score across all the originating calling party identifiers across all of the communications network monitored, a summary brand score across all the originating calling party identifiers on a specific one of the communications network 228 that is monitored, the summary brand score across for specific one of the originating calling party identifiers across all of the communication networks that are network monitored, the summary brand score for specific one of the originating calling party identifiers on a specific one of the communications network 228 that is monitored, or other relevant information.

In step 1342, querying, by the server 202, with a query string an artificial intelligence (AI) information system 408. The query string comprises a portion of at least one of the following: the originating calling party identifier, the plurality of calling party reputation data, or other relevant information. The method then moves to step 1344.

In step 1344, receiving, responsive to the query string, from the AI information system 408, a plurality of response data. The method then moves to step 1346.

In step 1346, using, by server 202, during the analysis of the plurality of originating calling party identifier brand identity data, brand security data, and brand reputation data at least a portion of the plurality of response data.

The capabilities of the present invention can be implemented in software, firmware, hardware, or some combination thereof.

As one example, one or more aspects of the present invention can be included in an article of manufacture (e.g., one or more computer program products) having, for instance, computer-usable media. The media has embodied therein, for instance, computer-readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of increasing call connections to consumers across multiple communications networks by analyzing call reputation and branding data associated with an originating calling party identifier and selecting the identifier with the most favorable reputation and most accurate branding for initiating consumer calls, the method comprising the steps:
   configuring, by a user, or identifying a previously configured a first computing device with a first receiving called party identifier and a second computing device with a second receiving called party identifier, each configured to operate on a communications network;
   initiating a first inquiry call attempt, wherein:
      a number sentry server transmits a request to a call generation server to place the first inquiry call attempt using an originating calling party identifier;
      the call generation server acknowledges the request and places the first inquiry call attempt to the first receiving called party identifier;
      receiving, at the first computing device, the first inquiry call attempt and capturing a plurality of calling party reputation data associated with the originating calling party identifier, if the call attempt is successfully received; and
      communicating, by the first computing device, the plurality of calling party reputation data captured to the number sentry server;
   initiating a second inquiry call attempt, if the first inquiry call attempt fails, wherein:
      the number sentry server transmits a request to the call generation server to place a second inquiry call attempt to the second receiving called party identifier;
      the call generation server acknowledges the request and places the second inquiry call attempt;
      receiving, at the second computing device, the second inquiry call attempt and capturing the plurality of calling party reputation data, if the second inquiry call attempt is successfully received; and
      communicating, by the second computing device, the plurality of calling party reputation data captured to the number sentry server;
   wherein the method further comprising the step of:
      determining, at the number sentry server, a preferred originating calling party identifier based on an originating calling party identifier risk factor determination, wherein the risk factor is computed based, in part, on the plurality of calling party reputation data;
      wherein the preferred originating calling party identifier is used to initiate consumer calls.

2. The method of claim 1, wherein the originating calling party identifier risk factor is computed based in part on an assessment of the plurality of calling party reputation data.

3. The method of claim 1, further comprising:
   recording, at the first computing device or second computing device, whichever is in use, a screenshot of the captured calling party reputation data displayed on the device.

4. The method of claim 3, further comprising:
   recording multiple of the screenshot at predetermined intervals.

5. The method of claim 1, further comprising:
   transmitting, by the first computing device or the second computing device whichever is in use, or by the number sentry server, one or more software control message-based commands to the call generation server to terminate the active inquiry call attempt; and
   terminating, by the call generation server, the active inquiry call attempt upon receiving the software control message-based command.

6. The method of claim 1, further comprising:
   applying a send data delay, at the first computing device or second computing device, whichever is in use, before transmitting the calling party reputation data to the number sentry server.

7. The method of claim 1, further comprising:
   receiving, at a third computing device operated by a second user, a brand report generated by the number sentry server, wherein the brand report includes originating calling party identifier brand data analyzed from multiple communication networks.

8. The method of claim 7, wherein the originating calling party identifier report categorizes each monitored originating calling party identifier for each communications network based in part on an assessment of the plurality of calling party reputation data and determination of brand match category.

9. The method of claim 1, further comprising:
   labeling, at the number sentry server, the originating calling party identifier as a blocked originating calling party identifier if both the first inquiry call attempt and second inquiry call attempt failed to return the plurality of calling party reputation data.

10. The method of claim 9, further comprising:
retesting each of the blocked originating calling party identifier at a predetermined retest period for a predetermined number of retests using different receiving called party identifiers on different computing devices within the same communications network.

11. The method of claim 1, further comprising:
determining a calling name associated with the originating calling party identifier, based on the plurality of calling party reputation data captured by the first computing device or second computing device.

12. The method of claim 11, further comprising:
receiving, at the number sentry server, an originating calling party identifier brand identity data, brand security data, and brand reputation data, based at least in part on the calling name and communications network;
generating a brand scan report, including at least one of the following:
  a summary brand score across all originating calling party identifiers across all monitored communications networks;
  a summary brand score for a specific originating calling party identifier across all monitored communications networks;
  a summary brand score for a specific originating calling party identifier on a specific communications network.

13. A method of increasing call connections to consumers across multiple communications networks by analyzing call reputation and branding data associated with an originating calling party identifier and selecting the identifier with the most favorable reputation and most accurate branding for initiating consumer calls, the method comprising the steps:
configuring, for operation on a plurality of communications networks, at least one first computing device associated with a first receiving called party identifier and at least one second computing device associated with a second receiving called party identifier;
for each originating calling party identifier and for each communications network, performing the following steps:
  initiating a first inquiry call attempt, wherein:
    a number sentry server transmits a request to a call generation server to place the first inquiry call attempt using an originating calling party identifier;
    the call generation server acknowledges the request and places the first inquiry call attempt to the first receiving called party identifier;
    receiving, at the first computing device, the first inquiry call attempt and capturing a plurality of calling party reputation data associated with the originating calling party identifier, if the call attempt is successfully received; and
    communicating, by the first computing device, the plurality of calling party reputation data captured to the number sentry server;
  initiating a second inquiry call attempt, if the first inquiry call attempt fails, wherein:
    the number sentry server transmits a request to the call generation server to place a second inquiry call attempt to the second receiving called party identifier;
    the call generation server acknowledges the request and places the second inquiry call attempt;
    receiving, at the second computing device, the second inquiry call attempt and capturing the plurality of calling party reputation data, if the second inquiry call attempt is successfully received; and
    communicating, by the second computing device, the plurality of calling party reputation data captured to the number sentry server;
wherein the method further comprising the steps of:
  repeating the steps for each originating calling party identifier across each of the plurality of communications networks being monitored; and
  determining, at the number sentry server, a preferred originating calling party identifier based on a plurality of originating calling party identifier risk factor or a brand match category determination, wherein the originating calling party identifier risk factor and the brand match category are computed based, in part, on the plurality of calling party reputation data captured from the first and second computing devices across each of the plurality of communications networks that are monitored;
wherein the preferred originating calling party identifier is used to initiate consumer calls.

14. The method of claim 13, wherein the originating calling party identifier risk factor is computed based in part on an assessment of the plurality of calling party reputation data.

15. The method of claim 13, further comprising:
recording, at the first computing device or second computing device, whichever is in use, a screenshot of at least a portion of the plurality of calling party reputation data displayed on the device.

16. The method of claim 13, further comprising:
transmitting, by the first computing device or the second computing device whichever is in use, or by the number sentry server, one or more software control message-based commands to the call generation server to terminate the active inquiry call attempt; and
terminating, by the call generation server, the active inquiry call attempt upon receiving the software control message-based command.

17. The method of claim 13, further comprising:
applying a send data delay, at the first computing device or second computing device, whichever is in use, before transmitting the calling party reputation data to the number sentry server.

18. The method of claim 13, further comprising:
receiving, at a third computing device operated by a second user, an originating calling party identifier report generated by the number sentry server, wherein the originating calling party identifier report includes originating calling party identifier brand data analyzed from multiple communication networks.

19. The method of claim 18, wherein the originating calling party identifier report categorizes each monitored originating calling party identifier for each communications network based in part on an assessment of the plurality of calling party reputation data and determination of brand match category.

20. A method of increasing call connections to consumers across multiple communications networks by analyzing call reputation and branding data associated with an originating calling party identifier and selecting the identifier with the most favorable reputation and most accurate branding for initiating consumer calls, the method comprising:
configuring, by a user, or identifying a previously configured at least one of a first computing device with a first receiving called party identifier and a second computing device with a second receiving called party identifier, each configured to operate on a communications network;

initiating a first inquiry call attempt, wherein:
   a number sentry server transmits a request to a call generation server to place the first inquiry call attempt using an originating calling party identifier;
   the call generation server acknowledges the request and places the first inquiry call attempt to the first receiving called party identifier;
   receiving, at the first computing device, the first inquiry call attempt and capturing calling party reputation data associated with the originating calling party identifier, if the call attempt is successfully received; and
   communicating, by the first computing device, the captured calling party reputation data to the number sentry server;

initiating a second inquiry call attempt, if the first inquiry call attempt fails, wherein:
   the number sentry server transmits a request to the call generation server to place a second inquiry call attempt to the second receiving called party identifier;
   the call generation server acknowledges the request and places the second inquiry call attempt;
   receiving, at the second computing device, the second inquiry call attempt and capturing the calling party reputation data, if the second inquiry call attempt is successfully received; and
   communicating, by the second computing device, the captured calling party reputation data to the number sentry server;

terminating the active inquiry call attempt by:
   transmitting, by the first computing device or the second computing device whichever is in use, or by the number sentry server, one or more software control message-based commands to the call generation server to terminate the active inquiry call attempt; and
   terminating, by the call generation server, the active inquiry call attempt upon receiving the software control message-based command;

wherein the method further comprising the step of:
   determining, at the number sentry server, a preferred originating calling party identifier based in part on an originating calling party identifier risk factor determination or a brand match category, wherein the risk factor is computed based, in part, on the plurality of calling party reputation data;
   wherein the preferred originating calling party identifier is used to initiate consumer calls.

* * * * *